(12) United States Patent
Gheorghiu et al.

(10) Patent No.: US 10,904,781 B2
(45) Date of Patent: Jan. 26, 2021

(54) MOBILITY MEASUREMENTS WITH INTERFERENCE CAUSED BY INTERMODULATION PRODUCTS

(71) Applicant: QUALCOMM Incorporated, San Diego, CA (US)

(72) Inventors: Valentin Alexandru Gheorghiu, Tokyo (JP); Gene Fong, San Diego, CA (US); Sumit Verma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 16/125,474

(22) Filed: Sep. 7, 2018

(65) Prior Publication Data

US 2019/0082337 A1    Mar. 14, 2019

Related U.S. Application Data

(60) Provisional application No. 62/557,080, filed on Sep. 11, 2017.

(51) Int. Cl.
*H04W 24/08* (2009.01)
*H04L 5/00* (2006.01)
(Continued)

(52) U.S. Cl.
CPC .......... *H04W 24/08* (2013.01); *H04B 17/318* (2015.01); *H04B 17/336* (2015.01);
(Continued)

(58) Field of Classification Search
CPC . H04W 24/08; H04W 24/10; H04W 72/0453; H04W 72/0473; H04W 74/0808;
(Continued)

(56) References Cited

U.S. PATENT DOCUMENTS

2008/0189970 A1* 8/2008 Wang ................ H04W 36/0055
33/701
2013/0044621 A1* 2/2013 Jung .................. H04W 72/082
370/252

(Continued)

OTHER PUBLICATIONS

Ericsson: "UE Capabilities and Configuration of per CC Measurement Gaps", R4-163463 Perccgappattern, 3rd Generation Partnership-Project (3GPP), Mobile Competence Centre; 650 Route Des Lucioles; F-06921 Sophia-Antipolis Cedex; France, vol. RAN WG4, No. Nanjing, China; May 23, 2016-May 27, 2016 May 22, 2016, XP051106463, Retrieved from the Internet: URL:http://www.3gpp.org/ftp/Meetings_3GPP_SYNC/RAN4/Docs/ [retrieved on May 22, 2016], 7 pages.

(Continued)

*Primary Examiner* — Curtis A Alia
(74) *Attorney, Agent, or Firm* — Holland & Hart LLP/Qualcomm Incorporated

(57) ABSTRACT

Methods, systems, and devices for wireless communication are described. A user equipment (UE) may mitigate self-interference and intermodulation products caused by communicating over two carriers in order to improve measurements of a third carrier. The UE may determine a measurement configuration to determine the quality of the third carrier. The measurement configuration may include identifying time periods with no scheduled uplink transmissions, time periods with a transmit power below a power threshold, time periods with frequency locations with an expected lower intermodulation interference, or time periods with a scheduled reference signal transmission (e.g., a synchronization signal (SS) block). The UE may also reduce a transmit power for a time period or drop a scheduled uplink transmission in order to perform more accurate measurements on the third carrier. In some cases, a base (Continued)

station may schedule a measurement gap for the UE to perform the measurements.

56 Claims, 23 Drawing Sheets

(51) Int. Cl.
*H04B 17/318* (2015.01)
*H04B 17/336* (2015.01)
*H04W 72/04* (2009.01)
*H04W 74/08* (2009.01)
*H04W 24/10* (2009.01)

(52) U.S. Cl.
CPC ......... *H04L 5/001* (2013.01); *H04W 72/0453* (2013.01); *H04W 72/0473* (2013.01); *H04W 74/0808* (2013.01); *H04L 5/0062* (2013.01); *H04W 24/10* (2013.01)

(58) Field of Classification Search
CPC ..... H04L 5/001; H04L 5/0062; H04B 17/318; H04B 17/336
See application file for complete search history.

(56) References Cited

U.S. PATENT DOCUMENTS

2016/0337893 A1 11/2016 Gheorghiu et al.
2017/0310450 A1* 10/2017 Galeev .................... H04W 4/02

OTHER PUBLICATIONS

International Search Report and Written Opinion—PCT/US2018/050235—ISA/EPO—dated Nov. 29, 2018.

* cited by examiner

MOBILITY MEASUREMENTS WITH INTERFERENCE CAUSED BY INTERMODULATION PRODUCTS

CROSS REFERENCES

The present Application for Patent claims the benefit of U.S. Provisional Patent Application No. 62/557,080 by GHEORGHIU et al., entitled "MOBILITY MEASUREMENTS WITH INTERFERENCE CAUSED BY INTERMODULATION PRODUCTS," filed Sep. 11, 2017, assigned to the assignee hereof, and expressly incorporated by reference in its entirety.

BACKGROUND

The following relates generally to wireless communication, and more specifically to mobility measurements with interference caused by intermodulation products.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may communicate with a base station over one or more channels or carriers (e.g., using carrier aggregation (CA)). A UE configured with multiple carriers may measure certain characteristics of an additional carrier that is different from one or more first carriers that the UE is actively using to transmit data. However, self-interference such as intermodulation products caused by communicating over more than one carrier may cause interference on the carrier to be measured, which may adversely affect the accuracy of the measurements. Inaccurate measurements of the carrier may affect mobility operations or otherwise degrade performance across the communications system.

SUMMARY

The described techniques relate to improved methods, systems, devices, or apparatuses that support mobility measurements with interference caused by intermodulation products. Generally, the described techniques provide for identifying a carrier for potential uplink communications from a user equipment (UE) with an uplink radio frequency (RF) chain, determining a measurement configuration for measuring the quality of the carrier based on an expected intermodulation interference on the carrier associated with uplink transmissions, and measuring the quality of the carrier based on the measurement configuration. The measurement configuration may include identifying a time period with no scheduled uplink transmissions, a time period with a transmit power below a power threshold, a time period with frequency locations with an expected lower intermodulation interference, or a time period with a scheduled reference signal transmission (e.g., a synchronization signal (SS) block), where the UE measures the quality of the carrier within the identified time period.

Additionally, the measurement configuration may include reducing a transmit power for a time period associated with an uplink transmission or dropping a scheduled uplink transmission. Alternatively, a measurement gap may be configured based on the expected intermodulation interference.

In some examples, a value for the expected intermodulation interference may be calculated, and the measurement of the quality of the carrier may be adjusted according to the calculated interference value. The UE may transmit a measurement of the quality of the carrier including the intermodulation interference and a measurement of the quality of the carrier free from the intermodulation interference. In some cases, the UE may receive an indication whether to measure the quality of the carrier with the interference or not. Additionally or alternatively, the UE may indicate whether a measurement of the quality of the carrier includes the intermodulation interference or not.

A method of wireless communication is described. The method may include receiving an indication to measure a quality of a carrier with an uplink RF chain of a plurality of uplink RF chains of the UE, determining a measurement configuration for measuring the quality of the carrier based on an expected intermodulation interference on the carrier that is associated with uplink transmissions from one or more of the plurality of uplink RF chains, and measuring the quality of the carrier based on the measurement configuration.

An apparatus for wireless communication is described. The apparatus may include means for receiving an indication to measure a quality of a carrier with an uplink RF chain of a plurality of uplink RF chains of the UE, means for determining a measurement configuration for measuring the quality of the carrier based on an expected intermodulation interference on the carrier that is associated with uplink transmissions from one or more of the plurality of uplink RF chains, and means for measuring the quality of the carrier based on the measurement configuration.

Another apparatus for wireless communication is described. The apparatus may include a processor, memory in electronic communication with the processor, and instructions stored in the memory. The instructions may be operable to cause the processor to receive an indication to measure a quality of a carrier with an uplink RF chain of a plurality of uplink RF chains of the UE, determine a measurement configuration for measuring the quality of the carrier based on an expected intermodulation interference on the carrier that is associated with uplink transmissions from one or more of the plurality of uplink RF chains, and measure the quality of the carrier based on the measurement configuration.

A non-transitory computer readable medium for wireless communication is described. The non-transitory computer-readable medium may include instructions operable to cause a processor to receive an indication to measure a quality of a carrier with an uplink RF chain of a plurality of uplink RF chains of the UE, determine a measurement configuration for measuring the quality of the carrier based on an expected intermodulation interference on the carrier that is associated with uplink transmissions from one or more of the plurality of uplink RF chains, and measure the quality of the carrier based on the measurement configuration.

Some examples of the method, apparatus, and non-transitory computer-readable medium described above may further include processes, features, means, or instructions for identifying a time period with no scheduled uplink transmissions, where the measurement configuration may be based on the identified time period with no scheduled uplink transmissions.

Some examples of the method, apparatus, and non-transitory computer-readable medium described above may further include processes, features, means, or instructions for identifying a time period with a scheduled uplink transmit power that may be below a power threshold, where the power threshold may be such that the expected intermodulation interference may be below an interference threshold, and where the measurement configuration may be based on the identified time period with the scheduled uplink transmit power that may be below the power threshold.

Some examples of the method, apparatus, and non-transitory computer-readable medium described above may further include processes, features, means, or instructions for identifying a time period with a scheduled frequency resource location associated with an uplink transmission, where the scheduled frequency resource location may be such that the expected intermodulation interference may be below an interference threshold, and where the measurement configuration may be based on the identified time period with the scheduled frequency resource location.

Some examples of the method, apparatus, and non-transitory computer-readable medium described above may further include processes, features, means, or instructions for identifying a time period with a scheduled reference signal transmission, where the scheduled reference signal transmission may be such that the expected intermodulation interference may be below an interference threshold, and where the measurement configuration may be based on the identified time period with the scheduled reference signal transmission.

In some examples of the method, apparatus, and non-transitory computer-readable medium described above, the scheduled reference signal transmission includes an SS block.

Some examples of the method, apparatus, and non-transitory computer-readable medium described above may further include processes, features, means, or instructions for reducing a transmit power for a time period associated with an uplink transmission, where the transmit power may be reduced such that the expected intermodulation interference may be below an interference threshold, and where the measurement configuration may be based on the time period associated with the uplink transmission.

Some examples of the method, apparatus, and non-transitory computer-readable medium described above may further include processes, features, means, or instructions for dropping a scheduled uplink transmission based on the expected intermodulation interference, where the measurement configuration may be based on the dropped scheduled uplink transmission.

Some examples of the method, apparatus, and non-transitory computer-readable medium described above may further include processes, features, means, or instructions for transmitting a request for a measurement gap based on the expected intermodulation interference. Some examples of the method, apparatus, and non-transitory computer-readable medium described above may further include processes, features, means, or instructions for receiving an indication of the measurement gap, where the measurement configuration may be based on the received indication of the measurement gap.

Some examples of the method, apparatus, and non-transitory computer-readable medium described above may further include processes, features, means, or instructions for calculating a value for the expected intermodulation interference. Some examples of the method, apparatus, and non-transitory computer-readable medium described above may further include processes, features, means, or instructions for adjusting a measurement of the quality of the carrier based on the calculated value of the expected intermodulation interference. Some examples of the method, apparatus, and non-transitory computer-readable medium described above may further include processes, features, means, or instructions for transmitting an indication of the adjusted measurement of the quality of the carrier.

Some examples of the method, apparatus, and non-transitory computer-readable medium described above may further include processes, features, means, or instructions for transmitting a measurement of the quality of the carrier that includes an interference associated with the expected intermodulation interference. Some examples of the method, apparatus, and non-transitory computer-readable medium described above may further include processes, features, means, or instructions for transmitting a measurement of the quality of the carrier that may be free from the interference associated with the expected intermodulation interference.

Some examples of the method, apparatus, and non-transitory computer-readable medium described above may further include processes, features, means, or instructions for receiving an indication whether to measure the quality of the carrier with the interference associated with the expected intermodulation interference.

Some examples of the method, apparatus, and non-transitory computer-readable medium described above may further include processes, features, means, or instructions for indicating whether a measurement of the quality of the carrier includes the interference associated with the expected intermodulation interference.

In some examples of the method, apparatus, and non-transitory computer-readable medium described above, a measurement of the quality of the carrier includes a reference signal received power (RSRP) measurement, a reference signal received quality (RSRQ) measurement, a reference signal (RS) signal to interference and noise ratio (SINR) measurement, or a combination thereof.

In some examples of the method, apparatus, and non-transitory computer-readable medium described above, a measurement of the quality of the carrier includes a downlink transmission measurement.

A method of wireless communication is described. The method may include identifying a carrier for potential communications with a UE, determining a measurement configuration for measuring a quality of the carrier based on an expected intermodulation interference on the carrier that is associated with uplink transmissions from one or more of a plurality of uplink RF chains of the UE, and transmitting an indication to measure the quality of the carrier based on the measurement configuration.

An apparatus for wireless communication is described. The apparatus may include means for identifying a carrier for potential communications with a UE, means for determining a measurement configuration for measuring a quality of the carrier based on an expected intermodulation interference on the carrier that is associated with uplink transmissions from one or more of a plurality of uplink RF chains of the UE, and means for transmitting an indication to measure the quality of the carrier based on the measurement configuration.

Another apparatus for wireless communication is described. The apparatus may include a processor, memory in electronic communication with the processor, and instructions stored in the memory. The instructions may be operable to cause the processor to identify a carrier for potential communications with a UE, determine a measurement configuration for measuring a quality of the carrier based on an expected intermodulation interference on the carrier that is associated with uplink transmissions from one or more of a plurality of uplink RF chains of the UE, and transmit an indication to measure the quality of the carrier based on the measurement configuration.

A non-transitory computer readable medium for wireless communication is described. The non-transitory computer-readable medium may include instructions operable to cause a processor to identify a carrier for potential communications with a UE, determine a measurement configuration for measuring a quality of the carrier based on an expected intermodulation interference on the carrier that is associated with uplink transmissions from one or more of a plurality of uplink RF chains of the UE, and transmit an indication to measure the quality of the carrier based on the measurement configuration.

Some examples of the method, apparatus, and non-transitory computer-readable medium described above may further include processes, features, means, or instructions for transmitting an indication of a scheduled measurement gap based on the expected intermodulation interference.

Some examples of the method, apparatus, and non-transitory computer-readable medium described above may further include processes, features, means, or instructions for receiving a request for a measurement gap, where the measurement configuration may be based on the request for the measurement gap.

Some examples of the method, apparatus, and non-transitory computer-readable medium described above may further include processes, features, means, or instructions for transmitting an indication whether to measure the quality of the carrier with an interference associated with the expected intermodulation interference.

Some examples of the method, apparatus, and non-transitory computer-readable medium described above may further include processes, features, means, or instructions for receiving a measurement of the quality of the carrier and an indication whether the measurement of the quality of the carrier includes the interference associated with the expected intermodulation interference.

Some examples of the method, apparatus, and non-transitory computer-readable medium described above may further include processes, features, means, or instructions for determining a frequency location of reference signal transmissions based on the expected intermodulation interference, where the measurement configuration may be based on the determined frequency location.

Some examples of the method, apparatus, and non-transitory computer-readable medium described above may further include processes, features, means, or instructions for identifying a time period with a scheduled reference signal transmission, where the scheduled reference signal transmission may be such that the expected intermodulation interference may be below an interference threshold, and where the measurement configuration may be based on the identified time period with the scheduled reference signal transmission.

In some examples of the method, apparatus, and non-transitory computer-readable medium described above, the scheduled reference signal transmission includes an SS block.

Some examples of the method, apparatus, and non-transitory computer-readable medium described above may further include processes, features, means, or instructions for scheduling uplink transmissions for at least one of the one or more of the plurality of uplink RF chains at a time during a time period based on the expected intermodulation interference.

In some examples of the method, apparatus, and non-transitory computer-readable medium described above, a measurement of the quality of the carrier includes a RSRP measurement, a RSRQ measurement, a RS-SINR measurement, or a combination thereof.

In some examples of the method, apparatus, and non-transitory computer-readable medium described above, a measurement of the quality of the carrier includes a downlink transmission measurement.

DETAILED DESCRIPTION

Figure 1:
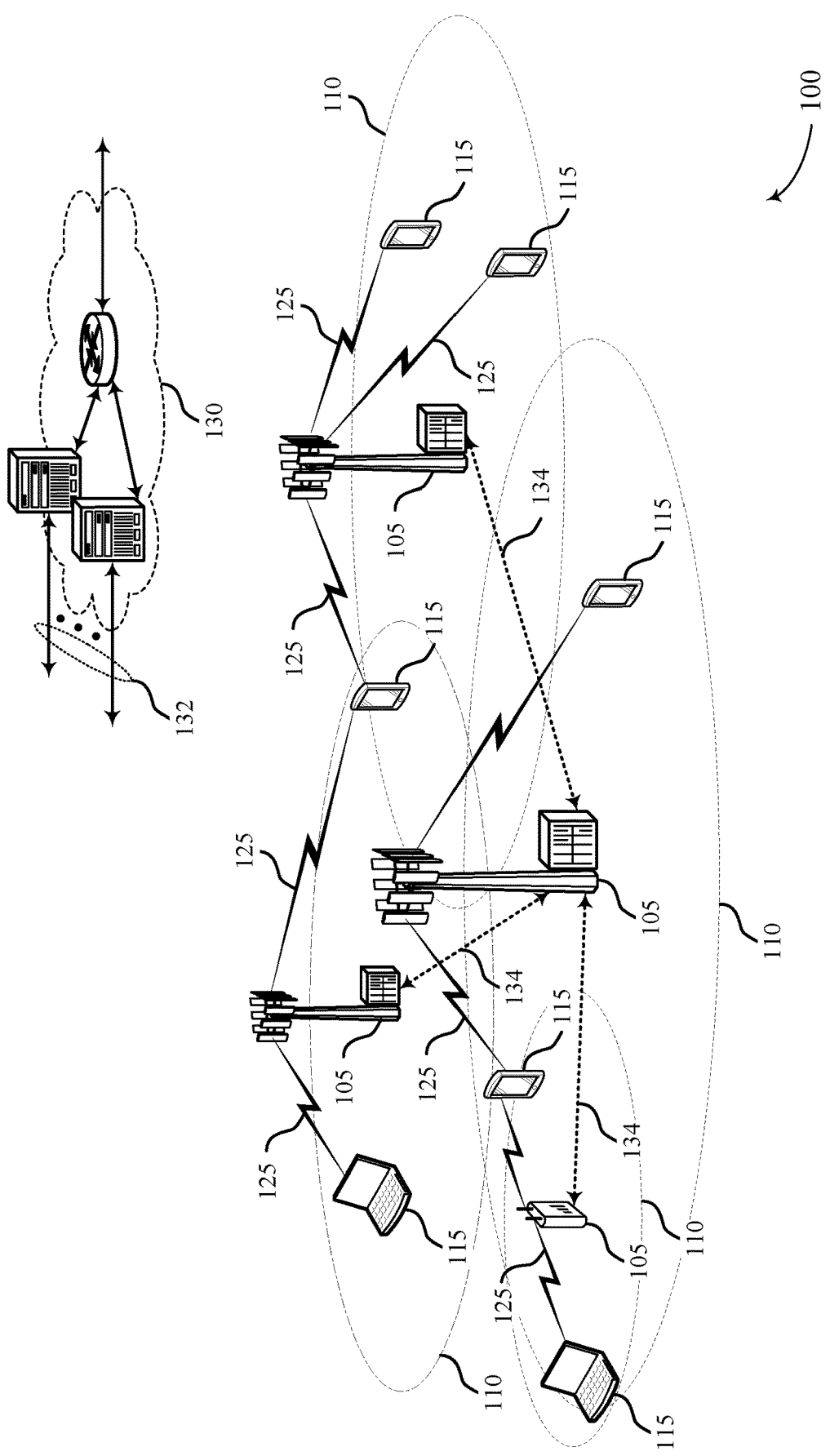
FIG. 1 illustrates an example of a system for wireless communication that supports mobility measurements with interference caused by intermodulation products in accordance with aspects of the present disclosure.

A user equipment (UE) may support carrier aggregation (CA) or communicating over more than one radio access technology (RAT) simultaneously (i.e., a non-standalone (NSA) UE). For example, the UE may have two radio frequency (RF) chains dedicated for uplink transmissions to a base station, where the UE may utilize one uplink RF chain for one RAT (e.g., Long Term Evolution (LTE)) and the second uplink RF chain for a second RAT (e.g., New Radio (NR)). Additionally, the UE may have two or more RF chains dedicated for downlink transmissions. In some cases, the UE may transmit data to the base station over the two uplink RF chains utilizing two carriers or channels (e.g., one carrier per RF chain), while also performing measurements (e.g., a reference signal received power (RSRP) measurement, a reference signal received quality (RSRQ) measurement, a reference signal (RS) signal to interference and noise ratio (SINR) measurement, or a combination thereof) on a third carrier to determine mobility feasibility for the third carrier. For example, while communicating on a first and second carrier for the two uplink RF chains, it may be more efficient to communicate on the third carrier instead of the first or second carrier based on the measurements performed at the UE. However, simultaneously communicating over the two carriers (e.g., first and second carrier) may result in a self-interference through intermodulation products which may affect the accuracy of the measurements of the third carrier. The signal power or quality of the third carrier may be overestimated or underestimated as a result of the intermodulation products which may lead to mobility problems or loss of system performance.

The UE may utilize different techniques to mitigate the self-interference and intermodulation products in order to obtain more accurate measurements for the third carrier. In general, the UE may calculate or otherwise anticipate an expected intermodulation interference on the third carrier based on simultaneous transmissions on the other two carriers. The UE may then determine (e.g., by determining a measurement configuration) a way to measure the third carrier such that the expected interference is either reduced to a negligible level, avoided altogether, or otherwise accounted for in the measurement. In some cases, when the level of self-interference is known, the UE may subtract the added noise from the self-interference (e.g., intermodulation product or interference) on a received signal from the base station on the third carrier and report the more accurate measurement (e.g., RSRP, RSRQ, RS-SINR). In some cases, the UE may perform the measurements on the third carrier when there are no uplink transmissions. For example, the UE may know which subframes or slots are needed for uplink signals in advance, so the UE may perform the measurements during subframes or slots when the transmitter is off, eliminating or reducing the effect of the self-interference on the measurements caused by the multiple uplink transmissions occurring simultaneously. In some cases, the UE may perform the measurements during subframes or slots when the transmission power is below a configured threshold value or during subframes or slots when the transmit frequency (e.g., resource block (RB)) allocation does not impact the accuracy of the measurements. In some cases, the UE may lower its transmission power for certain subframes or slots when performing the measurements (e.g., lowering the transmission power such that the level of self-interference and intermodulation product does not impact the measurements). In some cases, the UE may drop some uplink transmissions to perform the measurements.

Additionally or alternatively, the base station may schedule measurement gaps for the UE to perform the measurements on the third carrier. The measurement gaps may include subframes or slots where the base station does not schedule any uplink or downlink transmissions so that the UE may perform a more accurate measurement. In some cases, the UE may report two values for the measurements to improve its mobility capabilities, one value where self-interference affects the measurement and one value where self-interference does not affect the measurement. The base station may configure the UE to perform the measurement both ways, and the UE may inform the base station whether the values include measurements performed with or without self-interference. Based on the two measurements, the base station may determine the level of self-interference present for communications from the UE to improve communications (e.g., decoding capabilities) at each wireless device. In some cases, the UE may request the base station to schedule the measurement gaps. Additionally, the base station may schedule the measurement gaps during subframes or slots where the UE is capable of performing accurate measurements even without the measurement gap. In some cases, the base station may avoid scheduling simultaneous transmission on the multiple uplink RF chains that cause intermodulation interference when the UE is scheduled to perform measurements. For example, the base station may schedule uplink transmissions on only one carrier or RF chain at a time or may time division multiplex (TDM) the transmissions on multiple carriers.

In some wireless communications systems (e.g., NR), a base station may configure reference signal blocks (e.g., synchronization signal (SS) blocks or other pilot signals) for the UE, which may also provide frequency locations for providing measurements. In some cases, the UE may select a frequency location (e.g., SS block) that does not see self-interference to perform the measurements. The base station may further configure the UE with measurement locations at frequencies where self-interference does not occur. Additionally or alternatively, the base station may choose frequency locations for the reference signal blocks such that performed measurements at the locations would not be significantly affected by self-interference or intermodulation products. For example, the CA combinations supported in the network and, therefore, the locations of the intermodulation products may be known, so the base station may choose the frequency locations for the reference signals (e.g., the SS blocks or the other pilot signals) such that they do not overlap with the known locations of the intermodulation products.

Aspects of the disclosure are initially described in the context of wireless communications systems. An SS block configuration and a process flow are then described. Aspects of the disclosure are further illustrated by and described with reference to apparatus diagrams, system diagrams, and flowcharts that relate to mobility measurements with interference caused by intermodulation products.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE network, an LTE-Advanced (LTE-A) network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some wireless communications systems, a UE 115 may support communicating over more than one RAT (i.e., a NSA configuration for the UE 115), where, in some cases, the communications are supported through CA. For example, the UE 115 may have two RF chains dedicated for uplink transmissions to a base station 105, where the UE 115 may utilize one uplink RF chain for one RAT (e.g., LTE) and the second uplink RF chain for a second RAT (e.g., NR). Additionally, the UE 115 may have two or more RF chains dedicated for downlink transmissions. The RF chains may include a chain of physical RF devices, such as transmitters, receivers, cables, amplifiers, attenuators, measurement instruments, loads, etc., dedicated to uplink or downlink transmissions within the UE 115. In some cases, the UE 115 may transmit data to the base station 105 over the two uplink RF chains utilizing two carriers or channels (e.g., one carrier per RF chain) of a CA configuration. The UE 115 may also be simultaneously performing measurements (e.g., RSRP, RSRQ, RS-SINR) on a third carrier to determine mobility feasibility for the third carrier while transmitting data over the two uplink RF chains on the two carriers. However, communicating over the two carriers through CA may result in a self-interference through intermodulation products which may affect the accuracy of the measurements for the third carrier. The signal power or quality of the third carrier may be overestimated or underestimated as a result of the intermodulation products which may lead to mobility problems or loss of system performance.

Wireless communications system 100 may support efficient techniques for mitigating the self-interference and intermodulation products caused by communicating over the two carriers in order to improve measurements of the third carrier. In some cases, the UE 115 may mitigate the self-interference by subtracting the added noise from the intermodulation product from a received signal on the third carrier. Additionally or alternatively, the UE 115 may perform the measurements on the third carrier when there are no uplink transmissions on either the first or second carriers or both. In some cases, the UE 115 may perform the measurements during time durations (e.g., subframes or slots) when an uplink transmission power on the first two carriers is below a configured threshold. Additionally or alternatively, the UE 115 may lower the transmission power below the threshold for time durations in order to perform the measurements. In some cases, the UE 115 may drop uplink transmissions to perform the measurements.

Additionally, the UE 115 may request the base station 105 to schedule measurement gaps for performing the measurements, where the base station 105 does not schedule any uplink or downlink transmissions during a certain time duration according to the measurement gaps. The UE 115 may report a measurement value that includes the self-interference and a measurement value that does not include the self-interference. Reporting both values may improve mobility. In some cases, the UE 115 may choose a frequency location (e.g., SS block) with no self-interference to perform the measurements of the third carrier. Additionally or alternatively, the base station 105 may choose the frequency locations (e.g., SS blocks or other pilot signals) such that the locations for performing the measurements are not affected by the self-interference from the intermodulation products.

Figure 2:
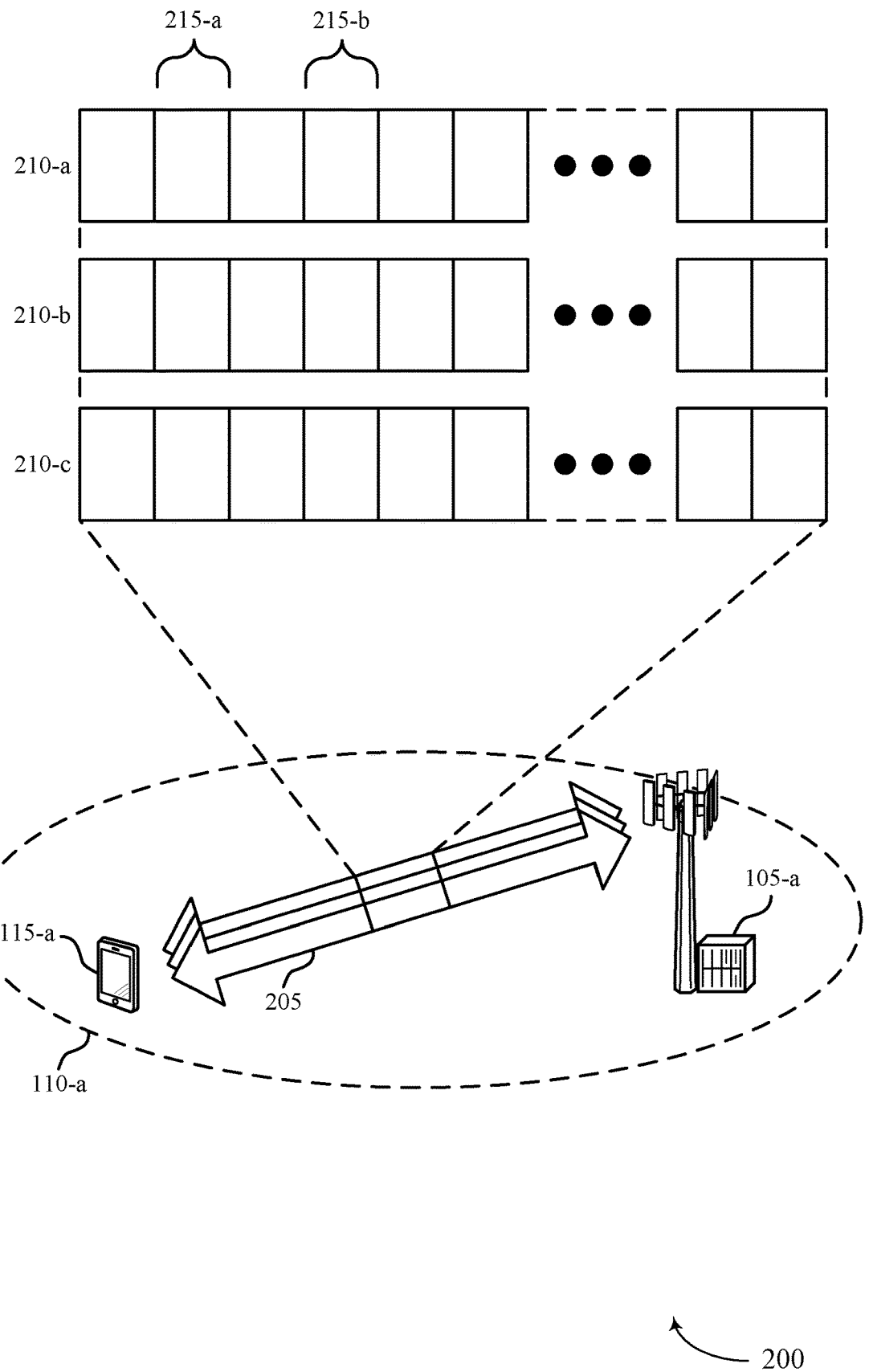
FIG. 2 illustrates an example of a wireless communications system that supports mobility measurements with interference caused by intermodulation products in accordance with aspects of the present disclosure.

FIG. 2 illustrates an example of a wireless communications system 200 that supports mobility measurements with interference caused by intermodulation products in accordance with various aspects of the present disclosure. In some examples, wireless communications system 200 may implement aspects of wireless communications system 100. Wireless communications system 200 may include a base station 105-a and a UE 115-a, which may be examples of corresponding base stations 105 and UEs 115, respectively, as described above with reference to FIG. 1. Base station 105-a and UE 115-a may communicate over multiple carriers 205. UE 115-a may initially transmit uplink data over a first carrier 210-a utilizing a first uplink RF chain and a second carrier 210-b utilizing a second uplink RF chain. In order to improve system performance and increase mobility, UE 115-a may perform measurements (e.g., signal-to-noise ratio (SNR), SINR, etc.) on a third carrier 210-c to determine if communications on the third carrier 210-c are more efficient than on the first carrier 210-a or the second carrier 210-b. In some cases, the UE 115-a may measure a quality of the third carrier 210-c, which may include an RSRP measurement, an RSRQ measurement, an RS-SINR measurement, or a combination thereof.

In some cases, communicating over the first carrier 210-a and the second carrier 210-b may lead to self-interference caused by an intermodulation product from the two communications. The self-interference may cause overestimated or underestimated measurements of the third carrier 210-c. If the level of self-interference is known, UE 115-a may subtract the added noise from a received signal over the third carrier 210-c and report the corrected value to base station 105-a. In some cases, UE 115-a may perform the measurements for the third carrier 210-c when there are no uplink transmissions on the first carrier 210-a, the second carrier 210-b, or neither carrier 210. For example, UE 115-a may know at a time duration 215-a (e.g., a subframe or a slot) that no uplink transmissions occur on the first carrier 210-a and/or the second carrier 210-b at a subsequent time duration 215-b. As such, UE 115-a may perform the measurements for the third carrier 210-c at time duration 215-b when the transmitter is off for the first RF chain and/or second RF chain.

In some cases, UE 115-a may perform the measurements in a time duration 215 when the transmission power is lower than a configured threshold or in a time duration 215 when the transmit frequency (e.g., RB allocation) is such that it does not impact the measurement accuracy. The strength and position of the intermodulation product and self-interference may depend on the RB allocation at a given point in time. Additionally or alternatively, UE 115-a may lower a transmission power below the configured threshold at certain time durations 215 to perform the measurements. The configured threshold may be set such that the level of self-interference does not impact the measurement accuracy. Additionally or alternatively, UE 115-a may drop uplink transmissions on the first carrier 210-a and/or on the second carrier 210-b in order to mitigate the self-interference and perform measurements on the third carrier 210-c.

In some cases, UE 115-a may request base station 105-a to schedule measurement gaps when UE 115-a is unable to mitigate the self-interference to support more accurate measurements. Accordingly, the measurement gaps may include a time duration 215 where base station 105-a does not schedule any uplink or downlink transmissions for the first carrier 210-a or the second carrier 210-b so that UE 115-a may perform accurate measurements on the third carrier 210-c. UE 115-a may report a measurement value that includes the self-interference and a measurement value that does not include the self-interference to improve mobility, such that base station 105-a may determine the level of self-interference UE 115-a is producing and determine to change carriers or perform similar mobility mitigations for UE 115-a based on the level of self-interference indicated.

In some cases, base station 105-a may configure UE 115-a to perform measurements with and without the self-interference. Accordingly, when performing the measurements both ways, UE 115-a may indicate which measurements were performed with and without the self-interference. In some cases, base station 105-a may schedule the measurement gap during a time duration 215 where UE 115-a may still be able to perform accurate measurements without a scheduled gap. Additionally or alternatively, base station 105-a may avoid scheduling simultaneous transmissions on the first carrier 210-a and the second carrier 210-b that may cause intermodulation products when UE 115-*a* performs measurements on the third carrier 210-*c*. For example, the base station 105-*a* may schedule uplink transmission on one carrier 210 or may TDM the transmissions on multiple carriers 210 to avoid the creating of intermodulation products during a measurement window. The measurements window in which UE 115-*a* performs the measurements may be known to both base station 105-*a* and UE 115-*a*, where the window may be configured by the network. In some cases, base station 105-*a* may schedule multiple uplink transmissions on more than one carrier 210 if the intermodulation product does not affect the carrier 210 being measured (e.g., the third carrier 210-*c*) based on knowing the measurement window for UE 115-*a*.

Figure 3:
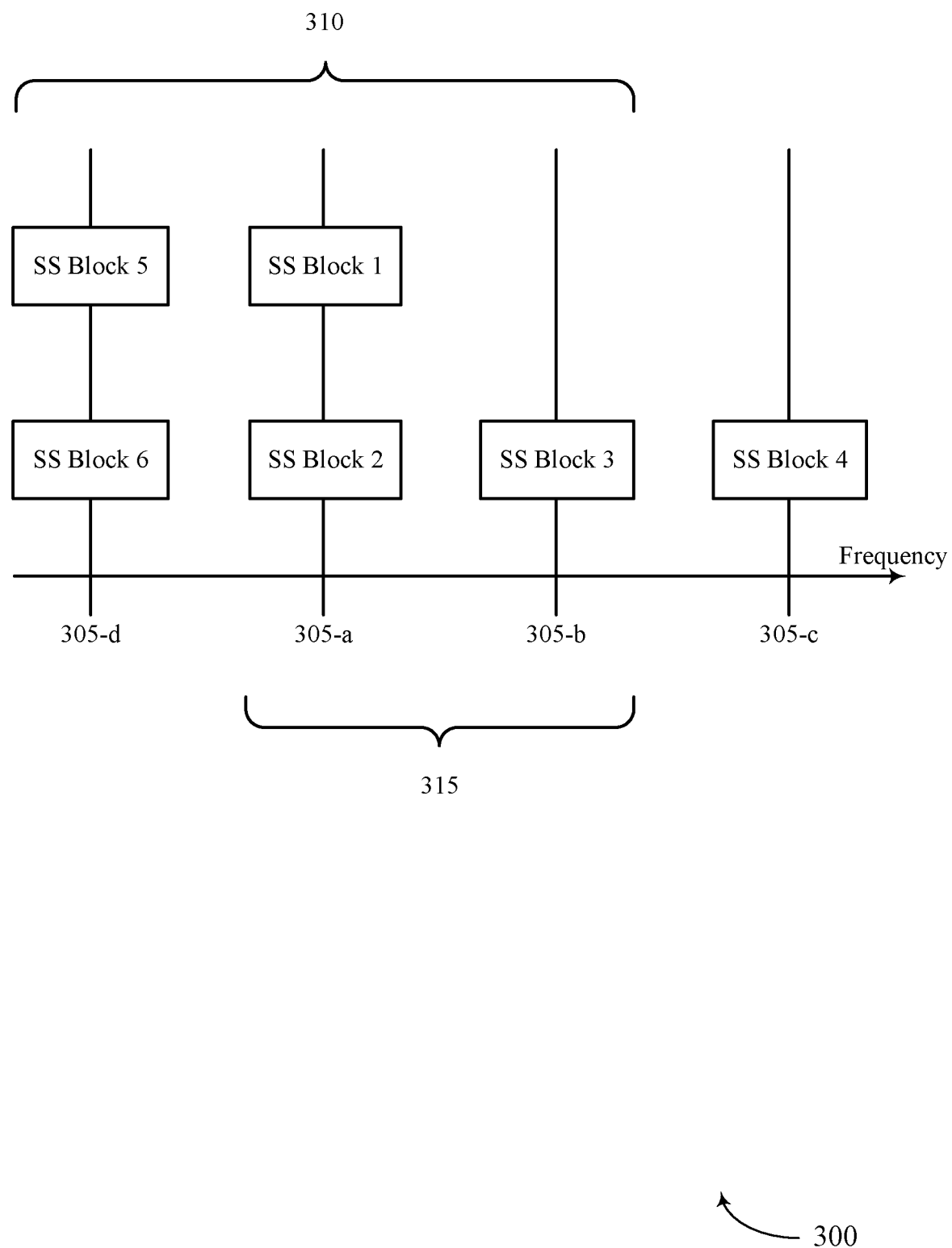
FIG. 3 illustrates an example of a synchronization signal (SS) block configuration that supports mobility measurements with interference caused by intermodulation products in accordance with aspects of the present disclosure.

FIG. 3 illustrates an example of a SS block configuration 300 that supports mobility measurements with interference caused by intermodulation products in accordance with various aspects of the present disclosure. In some examples, SS block configuration 300 may implement aspects of wireless communications systems 100 and/or 200 as described above with reference to FIGS. 1 and 2. A base station 105 may configure reference signal blocks (e.g., SS blocks) for a UE 115 at different frequencies 305, which may also provide frequency locations to provide measurements. The reference signal blocks may be indicated by SS blocks 1 through 6 for the UE 115. The base station 105 may have an operating bandwidth 310 consisting of frequencies 305-*a*, 305-*b*, and 305-*d*, and the UE 115 may have an operating bandwidth 315 consisting of frequencies 305-*a* and 305-*b*. SS blocks 1 and 5 may be configured by the base station 105 serving the UE 115, and SS blocks 2, 3, 4, and 6 may be configured by a neighbor base station 105.

In some cases, a UE 115 may select a frequency location (e.g., an SS block) that does not experience self-interference to perform measurements on a third carrier. For example, the UE 115 may select SS block 1 at frequency 305-*a* to perform the measurements for a third carrier while communicating over a first and second carrier. In some cases, the base station 105 may further configure the UE 115 with measurement locations where self-interference does not occur. For example, the base station 105 may transmit SS blocks at multiple frequency locations (e.g., SS blocks 1 and 5 at frequencies 305-*a* and 305-*d*, respectively) and configure the UE 115 with a specific SS block location where the UE 115 may perform accurate measurements for the third carrier (e.g., SS block 1 at frequency 305-*a*).

Additionally or alternatively, the base station 105 may choose frequency locations for the reference signal blocks such that if the UE 115 performed measurements at the locations, then the measurements would not be affected by self-interference or intermodulation products. For example, the CA combinations supported in the network and, therefore, the locations of the intermodulation products may be known, so the base station 105 may choose the frequency locations for the reference signals (e.g., SS blocks or other pilot signals) such that they do not correspond to the known locations of the intermodulation products (e.g., SS block 1).

Figure 4:
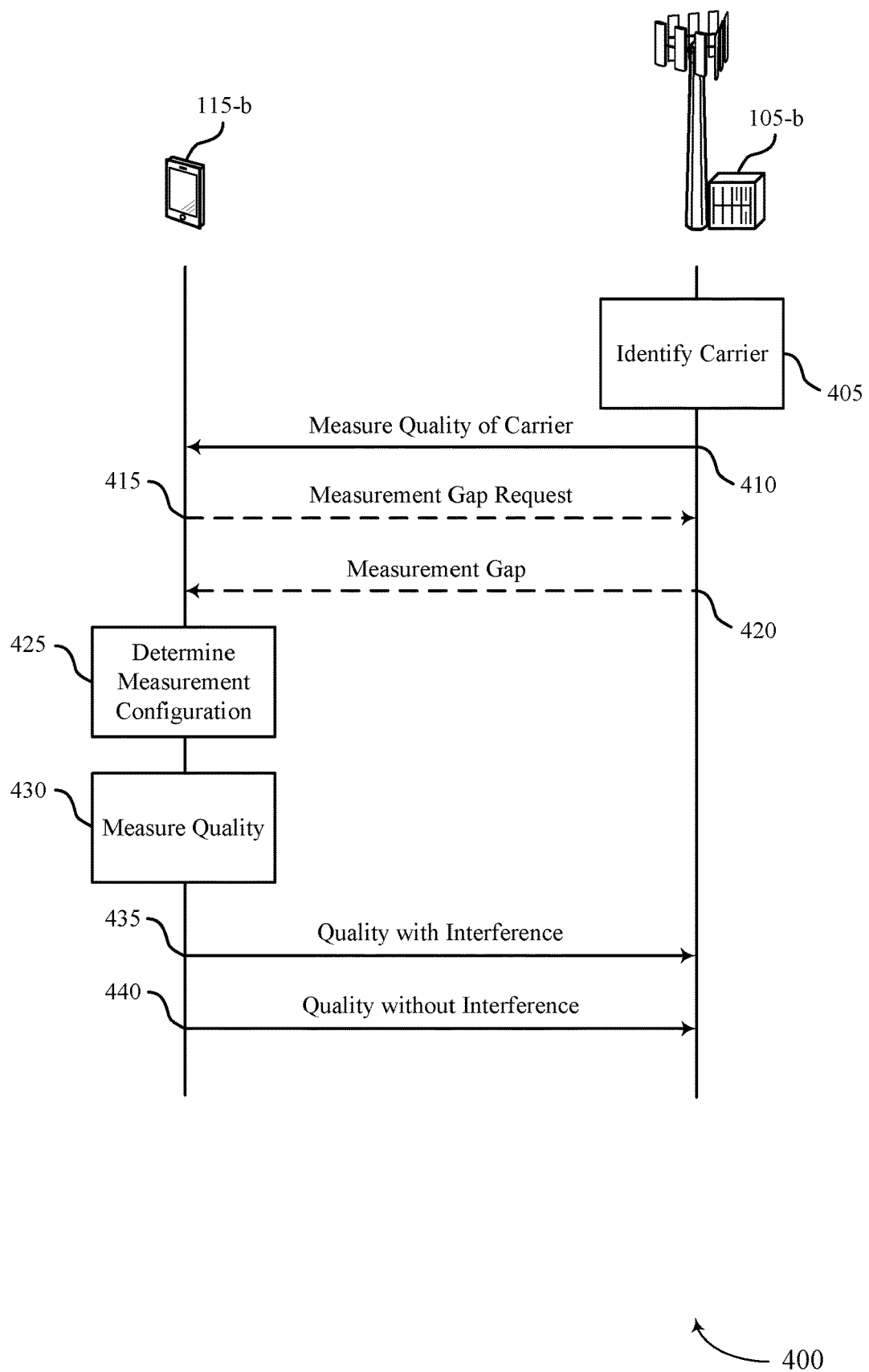
FIG. 4 illustrates an example of a process flow that supports mobility measurements with interference caused by intermodulation products in accordance with aspects of the present disclosure.

FIG. 4 illustrates an example of a process flow 400 that supports mobility measurements with interference caused by intermodulation products in accordance with various aspects of the present disclosure. In some examples, process flow 400 may implement aspects of wireless communications systems 100 and/or 200 as described above with reference to FIGS. 1 and 2. Process flow 400 illustrates aspects of techniques performed by a base station 105-*b* and a UE 115-*b*, which may be examples of a base station 105 and a UE 115, respectively, as described above with reference to FIGS. 1 through 3.

In the following description of the process flow 400, the operations between the UE 115-*b* and base station 105-*b* may be performed in different orders or at different times. Certain operations may also be left out of the process flow 400, or other operations may be added to the process flow 400.

At 405, base station 105-*b* may identify a carrier for potential communications with UE 115-*b*. This carrier identification may be in anticipation of a mobility operation or the configuration of an additional carrier for CA, for example.

At 410, base station 105-*b* may determine a measurement configuration for measuring a quality of the carrier based on an expected intermodulation interference on the carrier that is associated with uplink transmissions from one or more of a plurality of uplink RF chains of UE 115-*b*. Base station 105-*b* may then transmit an indication to measure a quality of the carrier based on the measurement configuration. A measurement of the quality of the carrier may include an RSRP measurement, an RSRQ measurement, an RS-SINR measurement, or a combination thereof. Additionally, base station 105-*b* may schedule uplink transmissions for at least one of the one or more of the plurality of uplink RF chains at a time during a time period based on the expected intermodulation interference. In some cases, base station 105-*b* may schedule multiple uplink transmissions if the intermodulation interference does not affect the carrier measured.

At 415, UE 115-*b* may transmit a request for a measurement gap based on an expected intermodulation interference (i.e., self-interference caused by intermodulation products). However, in accordance with aspects of the present disclosure, the UE 115-*b* may perform measurements without measurement gaps, and may not, in some examples, transmit a request for measurement gaps.

At 420, base station 105-*b* may transmit an indication of a scheduled measurement gap based on the expected intermodulation interference and receiving the request for the measurement gap.

At 425, UE 115-*b* may determine a measurement configuration for measuring the quality of the carrier based on the expected intermodulation interference on the carrier that is associated with uplink transmissions from one or more of the plurality of uplink RF chains. In some cases, the measurement configuration determination at UE 115-*b* may be in addition to or an alternative to the measurement configuration determination at base station 105-*b* at 410. In some cases, the measurement configuration may include UE 115-*b* identifying a time period with no scheduled uplink transmissions. Additionally or alternatively, the measurement configuration may include UE 115-*b* identifying a time period with a scheduled uplink transmit power that is below a power threshold, where the power threshold is such that the expected intermodulation interference is below an interference threshold. In some cases, the measurement configuration may include UE 115-*b* identifying a time period with a scheduled reference signal transmission, where the scheduled reference signal transmission is such that the expected intermodulation interference is below an interference threshold. In some cases, the scheduled reference signal transmission may include an SS block. Additionally or alternatively, the measurement configuration may include UE 115-*b* reducing a transmit power for a time period associated with an uplink transmission, where the transmit power is reduced such that the expected intermodulation interference is below an interference threshold. In some cases, the measurement configuration may include UE 115-*b* dropping a scheduled uplink transmission based on the expected intermodulation interference.

At 430, UE 115-*b* may measure the quality of the carrier based on the measurement configuration. In some cases, UE 115-*b* may measure the quality of the carrier on a downlink transmission. Additionally, UE 115-*b* may calculate a value for the expected intermodulation interference. UE 115-*b* may then adjust a measurement of the quality of the carrier based on the calculated value of the expected intermodulation interference and may transmit an indication of the adjusted measurement of the quality of the carrier.

At 435, UE 115-*b* may transmit a measurement of the quality of the carrier that includes an interference associated with the expected intermodulation interference. At 440, UE 115-*b* may transmit a measurement of the quality of the carrier that is free from the interference associated with the expected intermodulation interference. In some cases, UE 115-*b* may transmit the measurements with or without the interference based on receiving an indication whether to measure the quality of the carrier with the interference associated with the expected intermodulation interference from base station 105-*b*. Alternatively, UE 115-*b* may transmit the measurements with or without the interference along with an indication of whether a measurement of the quality of the carrier includes the interference associated with the expected intermodulation interference.

Figure 5:
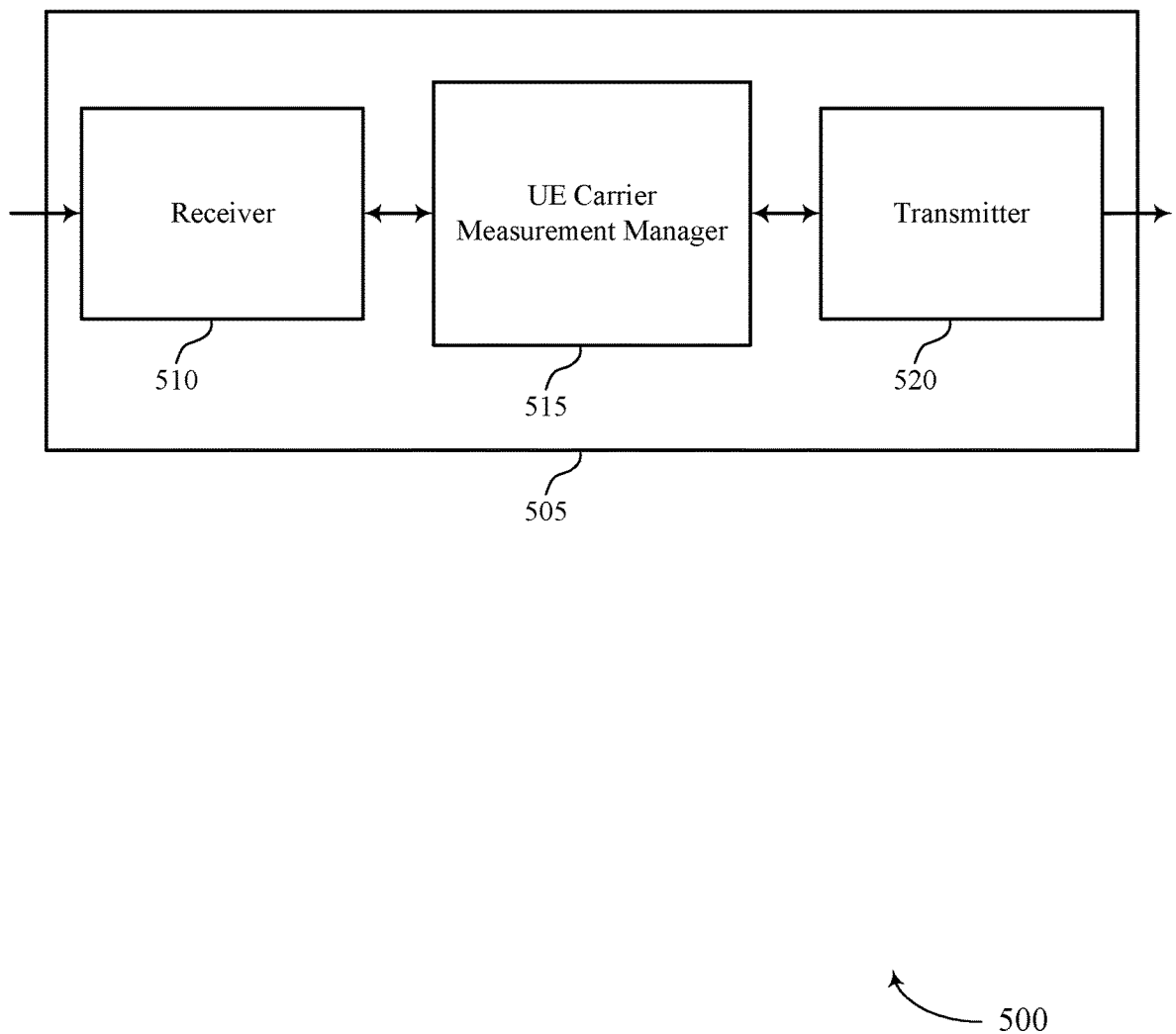
FIGS. 5 through 7 show block diagrams of a device that supports mobility measurements with interference caused by intermodulation products in accordance with aspects of the present disclosure.

FIG. 5 shows a block diagram 500 of a device 505 that supports mobility measurements with interference caused by intermodulation products in accordance with aspects of the present disclosure. Device 505 may be an example of aspects of a UE 115 as described herein. Device 505 may include receiver 510, UE carrier measurement manager 515, and transmitter 520. Device 505 may also include a processor. Each of these components may be in communication with one another (e.g., via one or more buses).

Receiver 510 may receive information such as packets, user data, or control information associated with various information channels (e.g., control channels, data channels, and information related to mobility measurements with interference caused by intermodulation products, etc.). Information may be passed on to other components of the device. The receiver 510 may be an example of aspects of the transceiver 835 described with reference to FIG. 8. The receiver 510 may utilize a single antenna or a set of antennas.

UE carrier measurement manager 515 may be an example of aspects of the UE carrier measurement manager 815 described with reference to FIG. 8.

UE carrier measurement manager 515 and/or at least some of its various sub-components may be implemented in hardware, software executed by a processor, firmware, or any combination thereof. If implemented in software executed by a processor, the functions of the UE carrier measurement manager 515 and/or at least some of its various sub-components may be executed by a general-purpose processor, a digital signal processor (DSP), an application-specific integrated circuit (ASIC), an field-programmable gate array (FPGA) or other programmable logic device (PLD), discrete gate or transistor logic, discrete hardware components, or any combination thereof designed to perform the functions described in the present disclosure. The UE carrier measurement manager 515 and/or at least some of its various sub-components may be physically located at various positions, including being distributed such that portions of functions are implemented at different physical locations by one or more physical devices. In some examples, UE carrier measurement manager 515 and/or at least some of its various sub-components may be a separate and distinct component in accordance with various aspects of the present disclosure. In other examples, UE carrier measurement manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE carrier measurement manager 515 may receive an indication to measure a quality of a carrier with an uplink RF chain of a set of uplink RF chains of a UE. Additionally, UE carrier measurement manager 515 may determine a measurement configuration for measuring the quality of the carrier based on an expected intermodulation interference on the carrier that is associated with uplink transmissions from one or more of the set of uplink RF chains. Accordingly, UE carrier measurement manager 515 may measure the quality of the carrier based on the measurement configuration.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
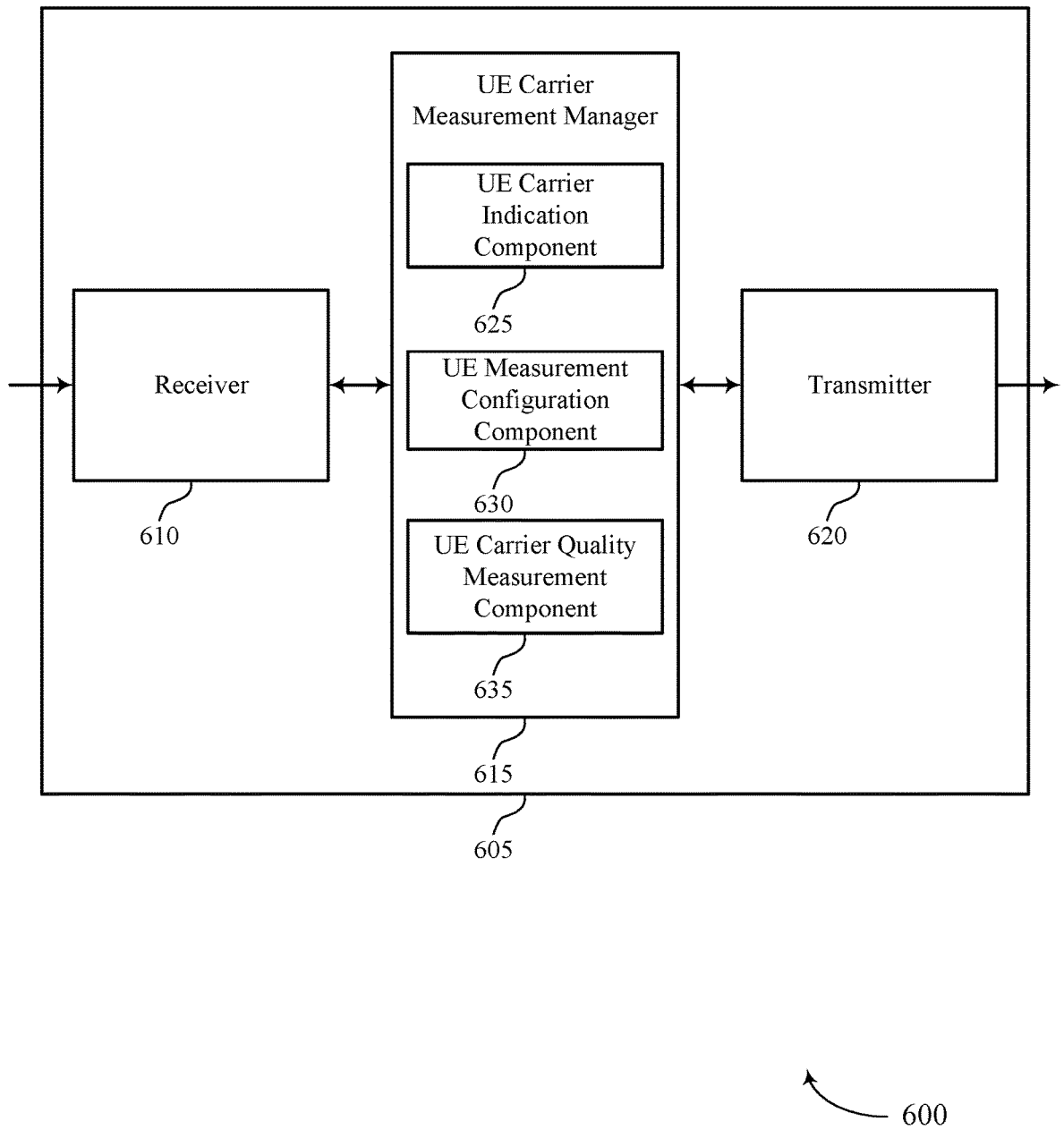

FIG. 6 shows a block diagram 600 of a device 605 that supports mobility measurements with interference caused by intermodulation products in accordance with aspects of the present disclosure. Device 605 may be an example of aspects of a device 505 or a UE 115 as described with reference to FIG. 5. Device 605 may include receiver 610, UE carrier measurement manager 615, and transmitter 620. Device 605 may also include a processor. Each of these components may be in communication with one another (e.g., via one or more buses).

Receiver 610 may receive information such as packets, user data, or control information associated with various information channels (e.g., control channels, data channels, and information related to mobility measurements with interference caused by intermodulation products, etc.). Information may be passed on to other components of the device. The receiver 610 may be an example of aspects of the transceiver 835 described with reference to FIG. 8. The receiver 610 may utilize a single antenna or a set of antennas.

UE carrier measurement manager 615 may be an example of aspects of the UE carrier measurement manager 815 described with reference to FIG. 8.

UE carrier measurement manager 615 may also include UE carrier indication component 625, UE measurement configuration component 630, and UE carrier quality measurement component 635.

UE carrier indication component 625 may receive an indication to measure a quality of a carrier with an uplink RF chain of a set of uplink RF chains of a UE.

UE measurement configuration component 630 may determine a measurement configuration for measuring the quality of the carrier based on an expected intermodulation interference on the carrier that is associated with uplink transmissions from one or more of the set of uplink RF chains. In some cases, the UE measurement configuration component 630 may identify a time period with no scheduled uplink transmissions, where the measurement configuration is based on the identified time period with no scheduled uplink transmissions. Additionally or alternatively, the UE measurement configuration component 630 may identify a time period with a scheduled uplink transmit power that is below a power threshold, where the power threshold is such that the expected intermodulation interference is below an interference threshold, and where the measurement configuration is based on the identified time period with the scheduled uplink transmit power that is below the power threshold.

In some cases, the UE measurement configuration component 630 may identify a time period with a scheduled frequency resource location associated with an uplink transmission, where the scheduled frequency resource location is such that the expected intermodulation interference is below an interference threshold, and where the measurement configuration is based on the identified time period with the scheduled frequency resource location. Additionally or alternatively, the UE measurement configuration component 630 may identify a time period with a scheduled reference signal transmission, where the scheduled reference signal transmission is such that the expected intermodulation interference is below an interference threshold, and where the measurement configuration is based on the identified time period with the scheduled reference signal transmission. In some cases, the scheduled reference signal transmission may include an SS block.

Additionally or alternatively, the UE measurement configuration component 630 may reduce a transmit power for a time period associated with an uplink transmission, where the transmit power is reduced such that the expected intermodulation interference is below an interference threshold, and where the measurement configuration is based on the time period associated with the uplink transmission. In some cases, the UE measurement configuration component 630 may drop a scheduled uplink transmission based on the expected intermodulation interference, where the measurement configuration is based on the dropped uplink transmission.

UE carrier quality measurement component 635 may measure the quality of the carrier based on the measurement configuration and transmit an indication of the adjusted measurement of the quality of the carrier. In some cases, UE carrier quality measurement component 635 may transmit a measurement of the quality of the carrier that includes an interference associated with the expected intermodulation interference and transmit a measurement of the quality of the carrier that is free from the interference associated with the expected intermodulation interference. In some cases, UE carrier quality measurement component 635 may receive an indication whether to measure the quality of the carrier with the interference associated with the expected intermodulation interference. Additionally or alternatively, UE carrier quality measurement component 635 may indicate whether a measurement of the quality of the carrier includes the interference associated with the expected intermodulation interference. In some cases, a measurement of the quality of the carrier may include an RSRP measurement, an RSRQ measurement, an RS-SINR measurement, or a combination thereof. In some cases, a measurement of the quality of the carrier may include a downlink transmission measurement.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
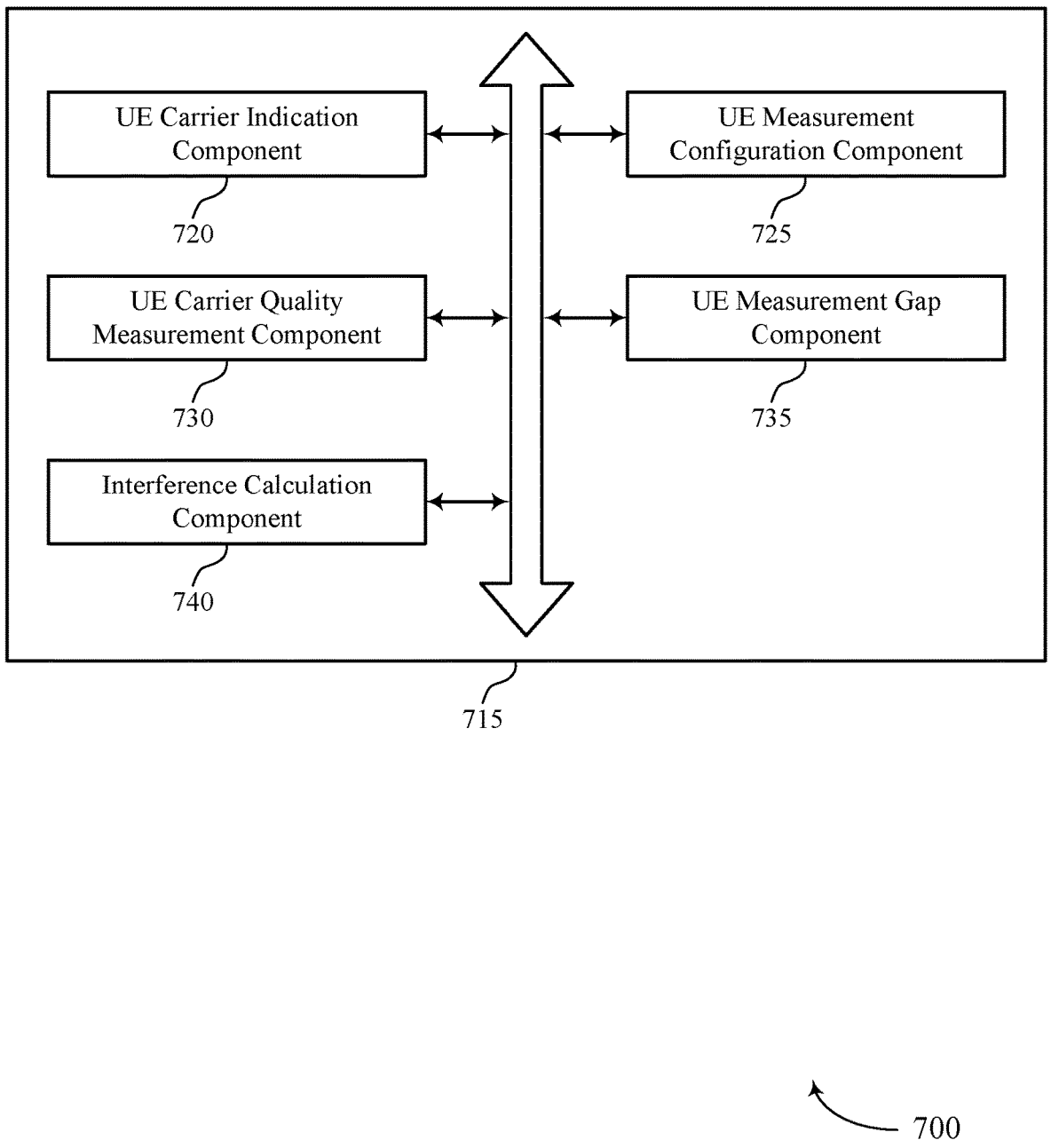

FIG. 7 shows a block diagram 700 of a UE carrier measurement manager 715 that supports mobility measurements with interference caused by intermodulation products in accordance with aspects of the present disclosure. The UE carrier measurement manager 715 may be an example of aspects of a UE carrier measurement manager 515, a UE carrier measurement manager 615, or a UE carrier measurement manager 815 described with reference to FIGS. 5, 6, and 8. The UE carrier measurement manager 715 may include UE carrier indication component 720, UE measurement configuration component 725, UE carrier quality measurement component 730, UE measurement gap component 735, and interference calculation component 740. Each of these modules may communicate, directly or indirectly, with one another (e.g., via one or more buses).

UE carrier indication component 720 may receive an indication to measure a quality of a carrier with an uplink RF chain of a set of uplink RF chains of a UE.

UE measurement configuration component 725 may determine a measurement configuration for measuring the quality of the carrier based on an expected intermodulation interference on the carrier that is associated with uplink transmissions from one or more of the set of uplink RF chains. In some cases, UE measurement configuration component 725 may identify a time period with no scheduled uplink transmissions, where the measurement configuration is based on the identified time period with no scheduled uplink transmissions. Additionally or alternatively, UE measurement configuration component 725 may identify a time period with a scheduled uplink transmit power that is below a power threshold, where the power threshold is such that the expected intermodulation interference is below an interference threshold, and where the measurement configuration is based on the identified time period with the scheduled uplink transmit power that is below the power threshold. In some cases, UE measurement configuration component 725 may identify a time period with a scheduled frequency resource location associated with an uplink transmission, where the scheduled frequency resource location is such that the expected intermodulation interference is below an interference threshold, and where the measurement configuration is based on the identified time period with the scheduled frequency resource location.

In some cases, UE measurement configuration component 725 may identify a time period with a scheduled reference signal transmission, where the scheduled reference signal transmission is such that the expected intermodulation interference is below an interference threshold, and where the measurement configuration is based on the identified time period with the scheduled reference signal transmission. In some cases, the scheduled reference signal transmission may include a SS block.

Additionally or alternatively, UE measurement configuration component 725 may reduce a transmit power for a time period associated with an uplink transmission, where the transmit power is reduced such that the expected intermodulation interference is below an interference threshold, and where the measurement configuration is based on the time period associated with the uplink transmission. In some cases, UE measurement configuration component 725 may drop a scheduled uplink transmission based on the expected intermodulation interference, where the measurement configuration is based on the dropped uplink transmission.

UE carrier quality measurement component 730 may measure the quality of the carrier based on the measurement configuration and transmit an indication of the adjusted measurement of the quality of the carrier. In some cases, UE carrier quality measurement component 730 may transmit a measurement of the quality of the carrier that includes an interference associated with the expected intermodulation interference and transmit a measurement of the quality of the carrier that is free from the interference associated with the expected intermodulation interference. In some cases, UE carrier quality measurement component 730 may receive an indication whether to measure the quality of the carrier with the interference associated with the expected intermodulation interference. Additionally or alternatively, UE carrier quality measurement component 730 may indicate whether a measurement of the quality of the carrier includes the interference associated with the expected intermodulation interference. In some cases, a measurement of the quality of the carrier may include an RSRP measurement, an RSRQ measurement, an RS-SINR measurement, or a combination thereof. In some cases, a measurement of the quality of the carrier may include a downlink transmission measurement.

UE measurement gap component 735 may transmit a request for a measurement gap based on the expected intermodulation interference and receive an indication of the measurement gap, where the measurement configuration is based on the received indication of the measurement gap.

Interference calculation component 740 may calculate a value for the expected intermodulation interference and adjust a measurement of the quality of the carrier based on the calculated value of the expected intermodulation interference.

Figure 8:
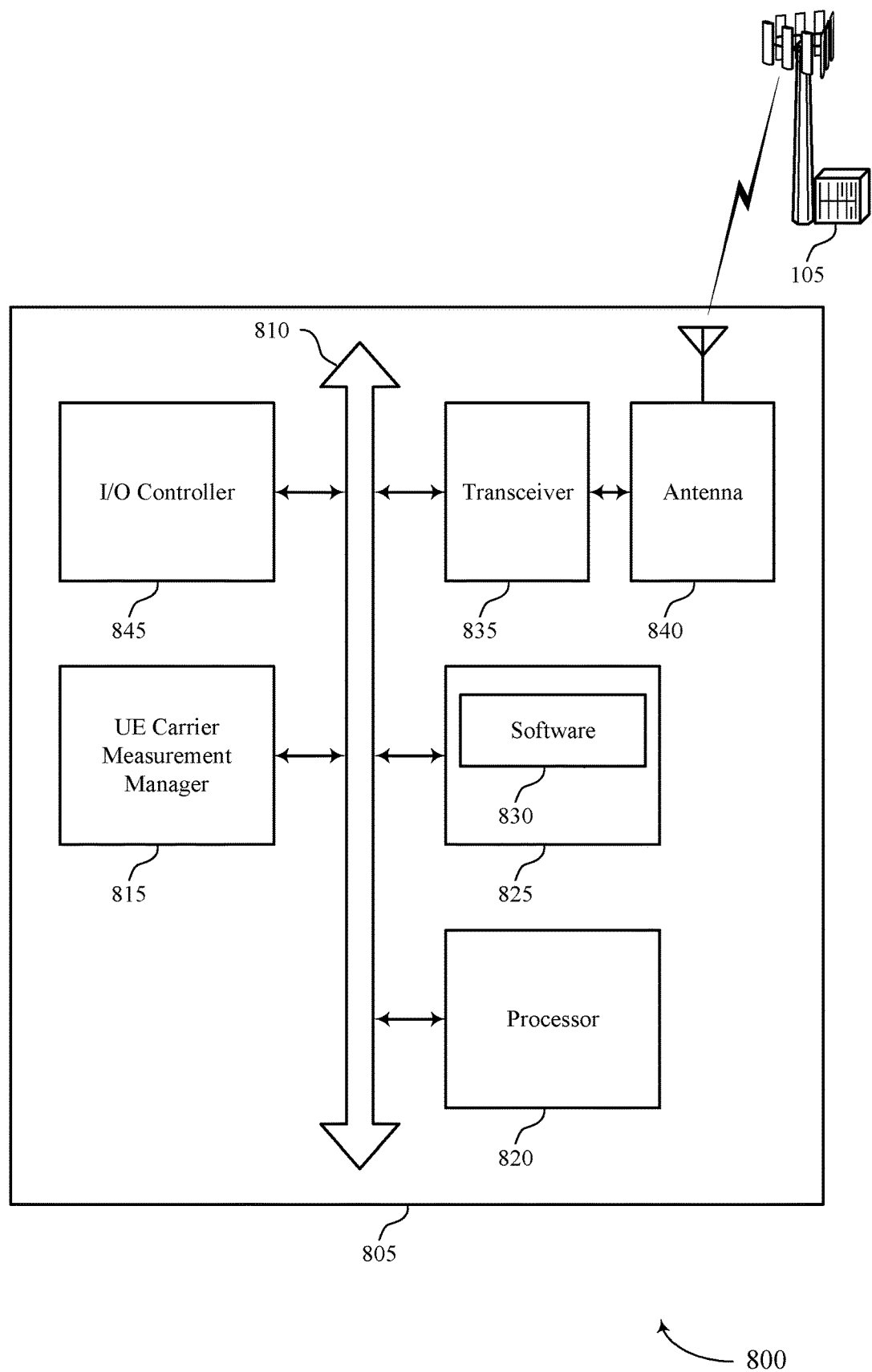
FIG. 8 illustrates a block diagram of a system including a UE that supports mobility measurements with interference caused by intermodulation products in accordance with aspects of the present disclosure.

FIG. 8 shows a diagram of a system 800 including a device 805 that supports mobility measurements with interference caused by intermodulation products in accordance with aspects of the present disclosure. Device 805 may be an example of or include the components of device 505, device 605, or a UE 115 as described above, e.g., with reference to FIGS. 5 and 6. Device 805 may include components for bi-directional voice and data communications including components for transmitting and receiving communications, including UE carrier measurement manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting mobility measurements with interference caused by intermodulation products).

Memory 825 may include random-access memory (RAM) and read-only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support mobility measurements with interference caused by intermodulation products. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
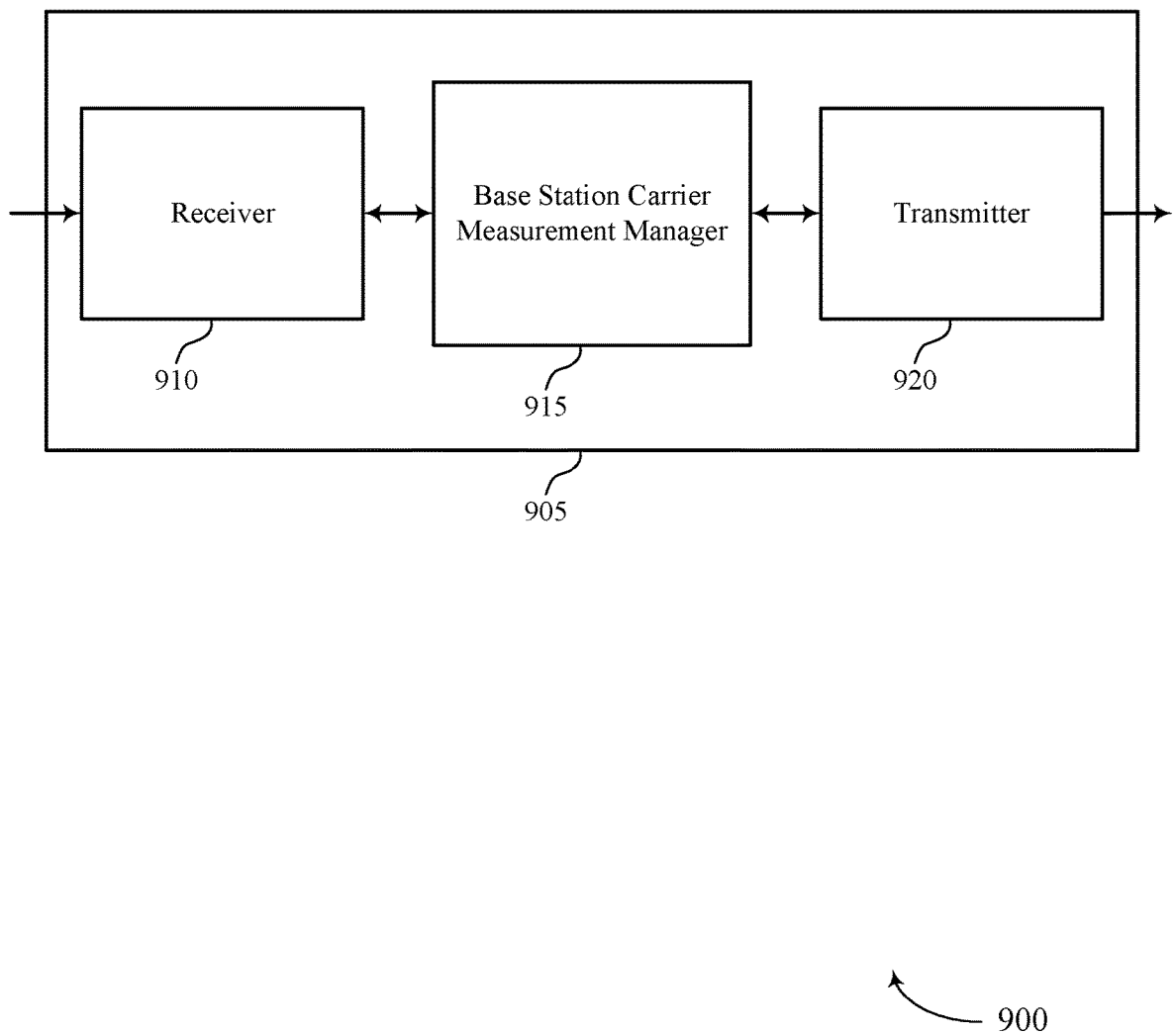
FIGS. 9 through 11 show block diagrams of a device that supports mobility measurements with interference caused by intermodulation products in accordance with aspects of the present disclosure.

FIG. 9 shows a block diagram 900 of a device 905 that supports mobility measurements with interference caused by intermodulation products in accordance with aspects of the present disclosure. Device 905 may be an example of aspects of a base station 105 as described herein. Device 905 may include receiver 910, base station carrier measurement manager 915, and transmitter 920. Device 905 may also include a processor. Each of these components may be in communication with one another (e.g., via one or more buses).

Receiver 910 may receive information such as packets, user data, or control information associated with various information channels (e.g., control channels, data channels, and information related to mobility measurements with interference caused by intermodulation products, etc.). Information may be passed on to other components of the device. The receiver 910 may be an example of aspects of the transceiver 1235 described with reference to FIG. 12. The receiver 910 may utilize a single antenna or a set of antennas.

Base station carrier measurement manager 915 may be an example of aspects of the base station carrier measurement manager 1215 described with reference to FIG. 12.

Base station carrier measurement manager 915 and/or at least some of its various sub-components may be implemented in hardware, software executed by a processor, firmware, or any combination thereof. If implemented in software executed by a processor, the functions of the base station carrier measurement manager 915 and/or at least some of its various sub-components may be executed by a general-purpose processor, a DSP, an ASIC, an FPGA or other PLD, discrete gate or transistor logic, discrete hardware components, or any combination thereof designed to perform the functions described in the present disclosure. The base station carrier measurement manager 915 and/or at least some of its various sub-components may be physically located at various positions, including being distributed such that portions of functions are implemented at different physical locations by one or more physical devices. In some examples, base station carrier measurement manager 915 and/or at least some of its various sub-components may be a separate and distinct component in accordance with various aspects of the present disclosure. In other examples, base station carrier measurement manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station carrier measurement manager 915 may identify a carrier for potential uplink communications from a UE. Additionally, base station carrier measurement manager 915 may determine a measurement configuration for measuring the quality of the carrier based on an expected intermodulation interference on the carrier that is associated with uplink transmissions from one or more of a set of uplink RF chains of the UE. In some cases, base station carrier measurement manager 915 may transmit an indication to measure a quality of the carrier based on the measurement configuration.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
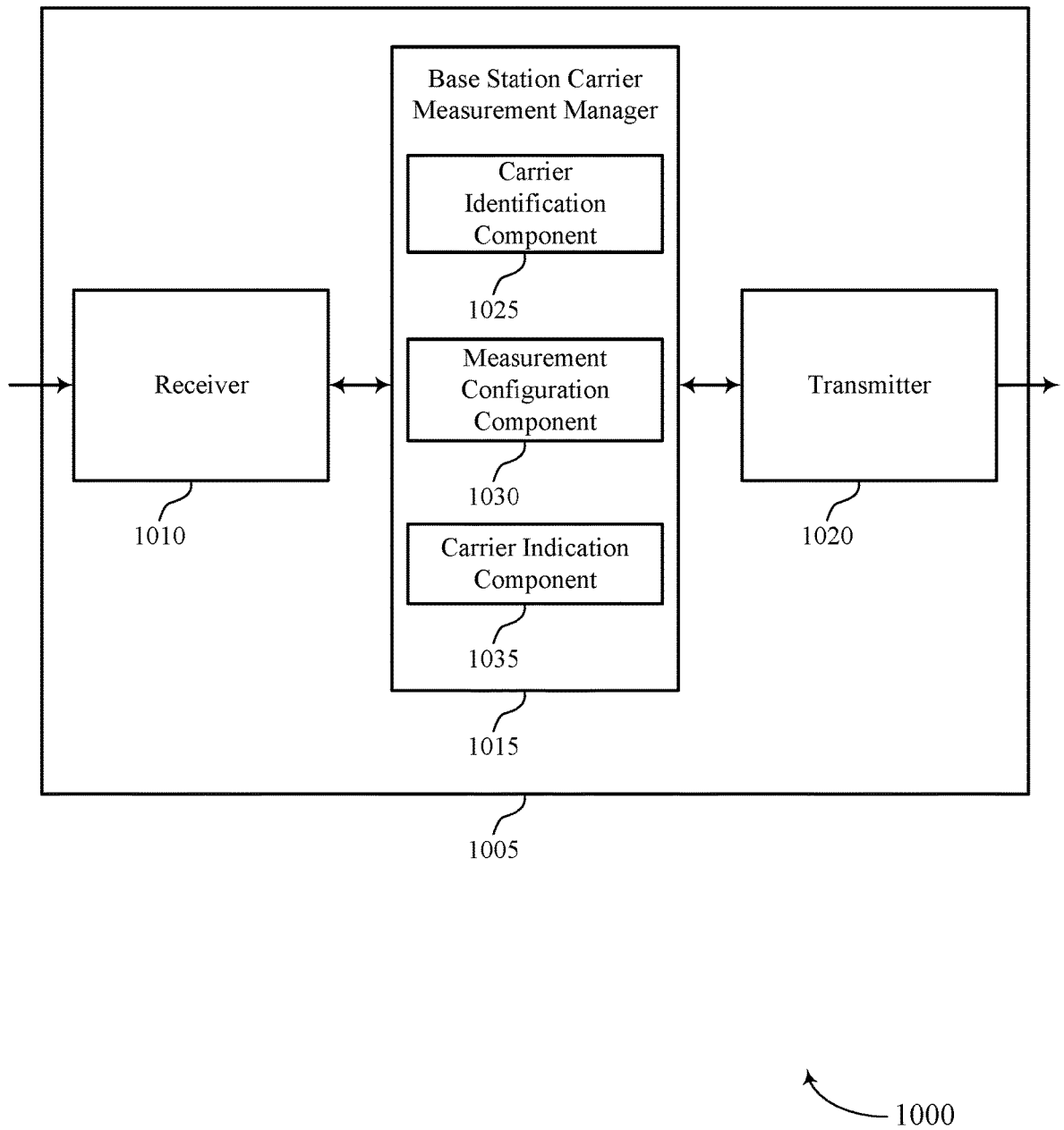

FIG. 10 shows a block diagram 1000 of a device 1005 that supports mobility measurements with interference caused by intermodulation products in accordance with aspects of the present disclosure. Device 1005 may be an example of aspects of a device 905 or a base station 105 as described with reference to FIG. 9. Device 1005 may include receiver 1010, base station carrier measurement manager 1015, and transmitter 1020. Device 1005 may also include a processor. Each of these components may be in communication with one another (e.g., via one or more buses).

Receiver 1010 may receive information such as packets, user data, or control information associated with various information channels (e.g., control channels, data channels, and information related to mobility measurements with interference caused by intermodulation products, etc.). Information may be passed on to other components of the device. The receiver 1010 may be an example of aspects of the transceiver 1235 described with reference to FIG. 12. The receiver 1010 may utilize a single antenna or a set of antennas.

Base station carrier measurement manager 1015 may be an example of aspects of the base station carrier measurement manager 1215 described with reference to FIG. 12.

Base station carrier measurement manager 1015 may also include carrier identification component 1025, measurement configuration component 1030, and carrier indication component 1035.

Carrier identification component 1025 may identify a carrier for potential uplink communications from a UE.

Measurement configuration component 1030 may determine a measurement configuration for measuring the quality of the carrier based on an expected intermodulation interference on the carrier that is associated with uplink transmissions from one or more of a set of uplink RF chains of the UE and determine a frequency location of reference signal transmissions based on the expected intermodulation interference, where the measurement configuration is based on the determined frequency location. In some cases, the scheduled reference signal transmission may include an SS block.

Carrier indication component 1035 may transmit an indication to measure a quality of the carrier based on the measurement configuration.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
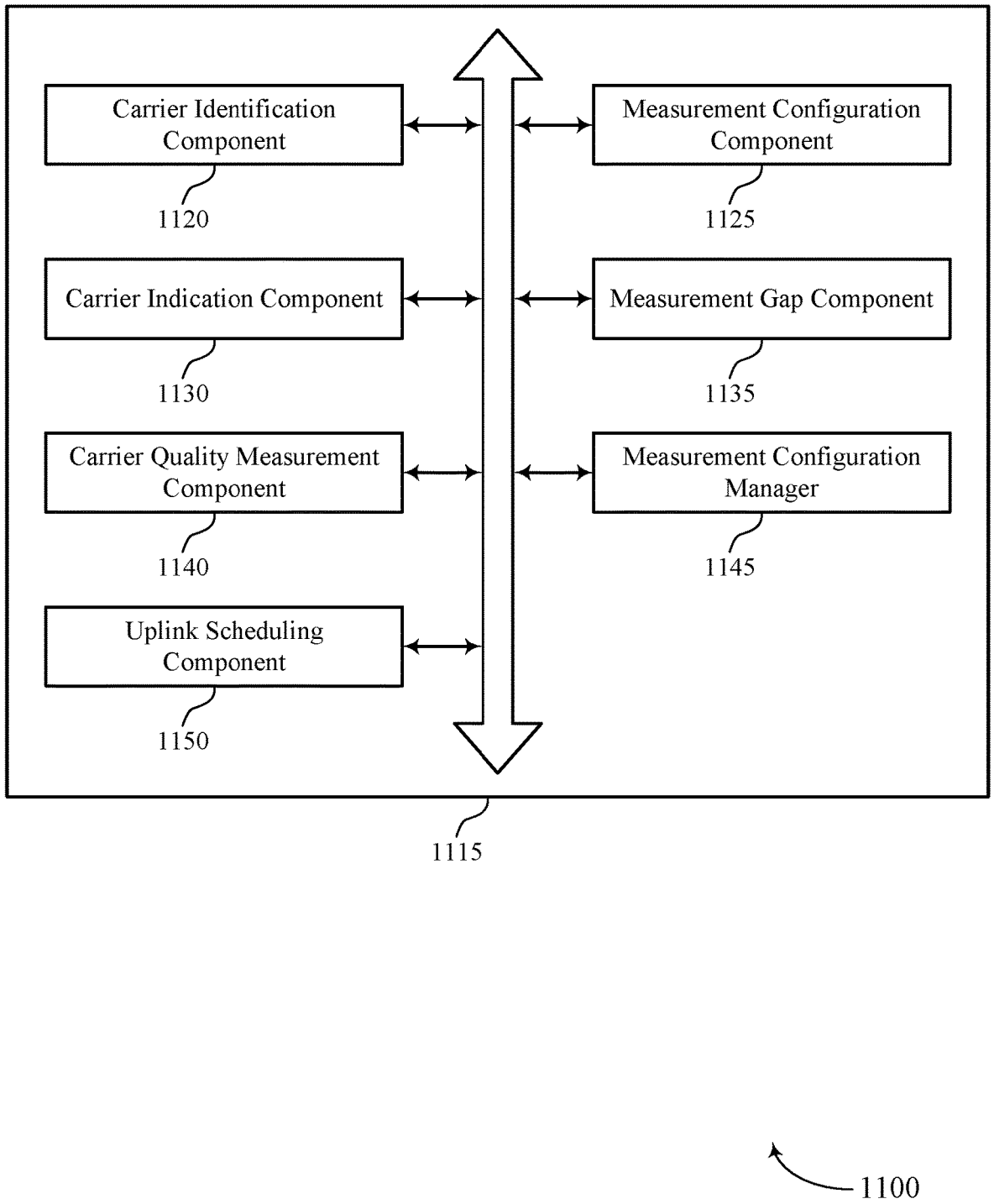

FIG. 11 shows a block diagram 1100 of a base station carrier measurement manager 1115 that supports mobility measurements with interference caused by intermodulation products in accordance with aspects of the present disclosure. The base station carrier measurement manager 1115 may be an example of aspects of a base station carrier measurement manager 1215 described with reference to FIGS. 9, 10, and 12. The base station carrier measurement manager 1115 may include carrier identification component 1120, measurement configuration component 1125, carrier indication component 1130, measurement gap component 1135, carrier quality measurement component 1140, measurement configuration manager 1145, and uplink scheduling component 1150. Each of these modules may communicate, directly or indirectly, with one another (e.g., via one or more buses).

Carrier identification component 1120 may identify a carrier for potential uplink communications from a UE.

Measurement configuration component 1125 may determine a measurement configuration for measuring the quality of the carrier based on an expected intermodulation interference on the carrier that is associated with uplink transmissions from one or more of a set of uplink RF chains of the UE and determine a frequency location of reference signal transmissions based on the expected intermodulation interference, where the measurement configuration is based on the determined frequency location. In some cases, the scheduled reference signal transmission may include an SS block.

Carrier indication component 1130 may transmit an indication to measure a quality of the carrier based on the measurement configuration.

Measurement gap component 1135 may transmit an indication of a scheduled measurement gap based on the expected intermodulation interference and receive a request for a measurement gap, where the measurement configuration is based on the request for the measurement gap.

Carrier quality measurement component 1140 may transmit an indication whether to measure the quality of the carrier with an interference associated with the expected intermodulation interference and receive a measurement of the quality of the carrier and an indication whether the measurement of the quality of the carrier includes the interference associated with the expected intermodulation interference. In some cases, a measurement of the quality of the carrier may include an RSRP measurement, an RSRQ measurement, an RS-SINR measurement, or a combination thereof. In some cases, a measurement of the quality of the carrier may include a downlink transmission measurement.

Measurement configuration manager 1145 may identify a time period with a scheduled reference signal transmission, where the scheduled reference signal transmission is such that the expected intermodulation interference is below an interference threshold, and where the measurement configuration is based on the identified time period with the scheduled reference signal transmission.

Uplink scheduling component 1150 may schedule uplink transmissions for at least one of the one or more of the set of uplink RF chains at a time during a time period based on the expected intermodulation interference.

Figure 12:
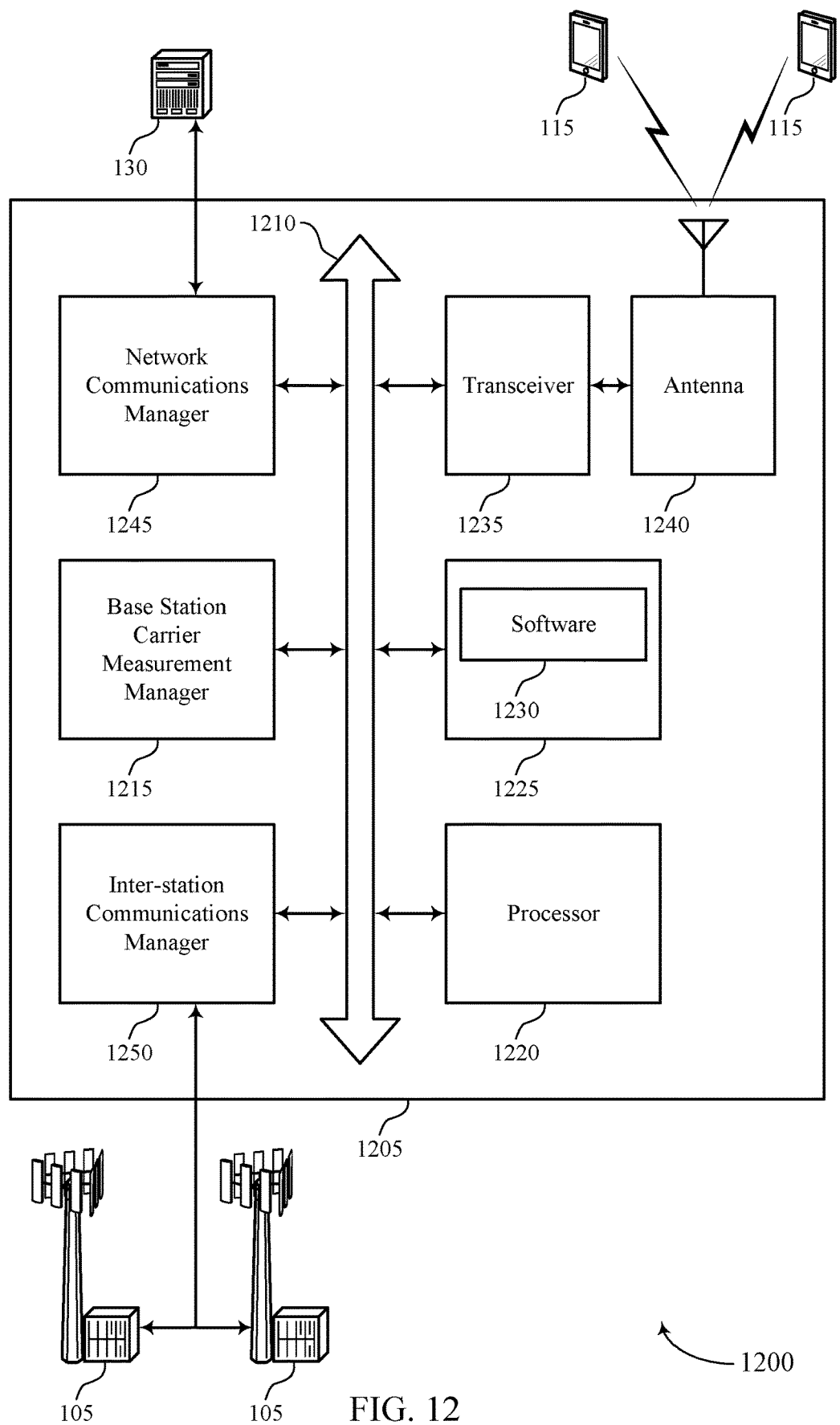
FIG. 12 illustrates a block diagram of a system including a base station that supports mobility measurements with interference caused by intermodulation products in accordance with aspects of the present disclosure.

FIG. 12 shows a diagram of a system 1200 including a device 1205 that supports mobility measurements with interference caused by intermodulation products in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station carrier measurement manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting mobility measurements with interference caused by intermodulation products).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support mobility measurements with interference caused by intermodulation products. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
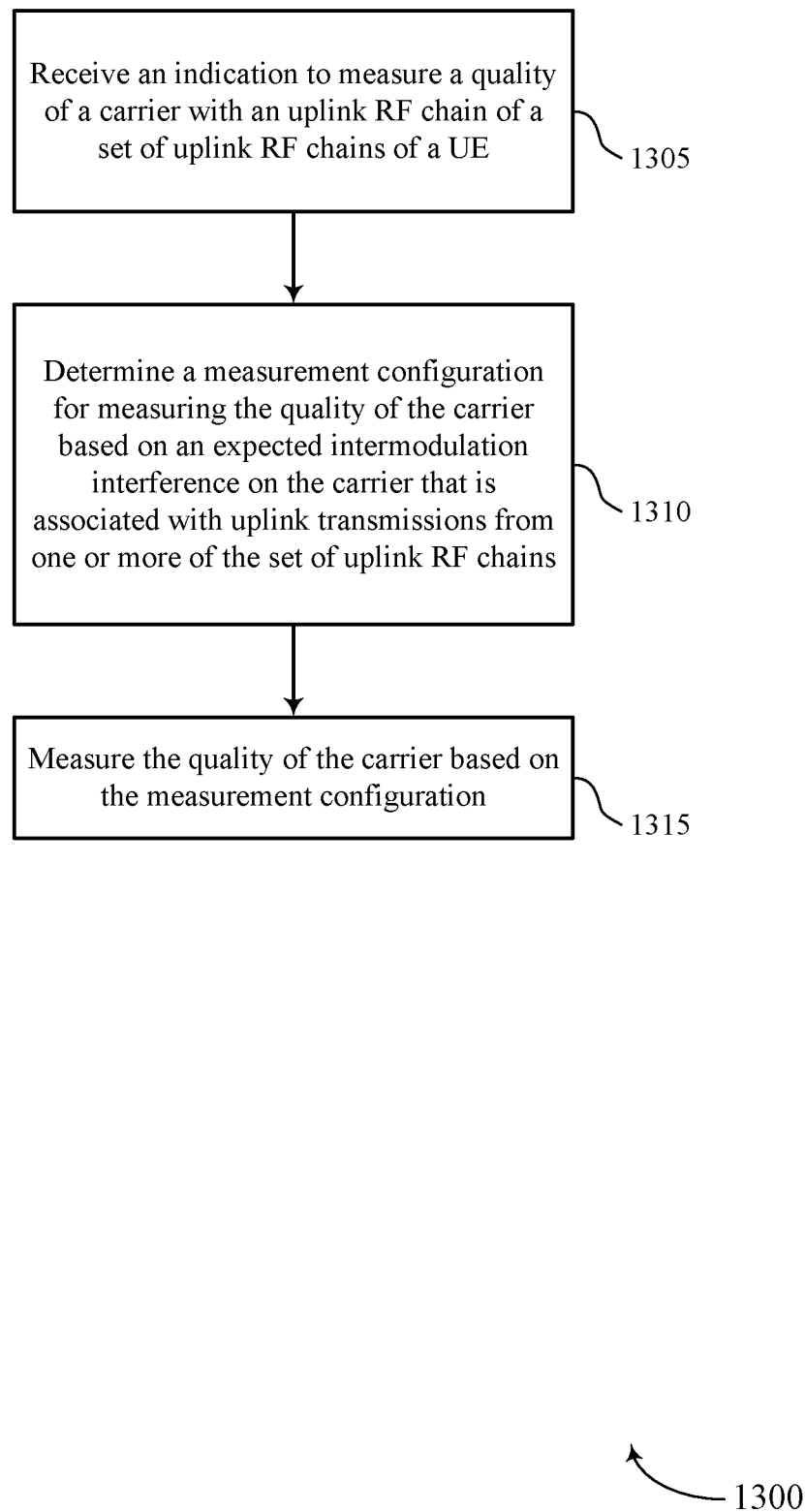
FIGS. 13 through 23 illustrate methods for mobility measurements with interference caused by intermodulation products in accordance with aspects of the present disclosure.

FIG. 13 shows a flowchart illustrating a method 1300 for mobility measurements with interference caused by intermodulation products in accordance with aspects of the present disclosure. The operations of method 1300 may be implemented by a UE 115 or its components as described herein. For example, the operations of method 1300 may be performed by a UE carrier measurement manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305, the UE 115 may receive an indication to measure a quality of a carrier with an uplink RF chain of a plurality of uplink RF chains of the UE. The operations of 1305 may be performed according to the methods described herein. In certain examples, aspects of the operations of 1305 may be performed by a UE carrier indication component as described with reference to FIGS. 5 through 8.

At 1310, the UE 115 may determine a measurement configuration for measuring the quality of the carrier based on an expected intermodulation interference on the carrier that is associated with uplink transmissions from one or more of the plurality of uplink RF chains. The operations of 1310 may be performed according to the methods described herein. In certain examples, aspects of the operations of 1310 may be performed by a UE measurement configuration component as described with reference to FIGS. 5 through 8.

At 1315, the UE 115 may measure the quality of the carrier based on the measurement configuration. The operations of 1315 may be performed according to the methods described herein. In certain examples, aspects of the operations of 1315 may be performed by a UE carrier quality measurement component as described with reference to FIGS. 5 through 8.

Figure 14:
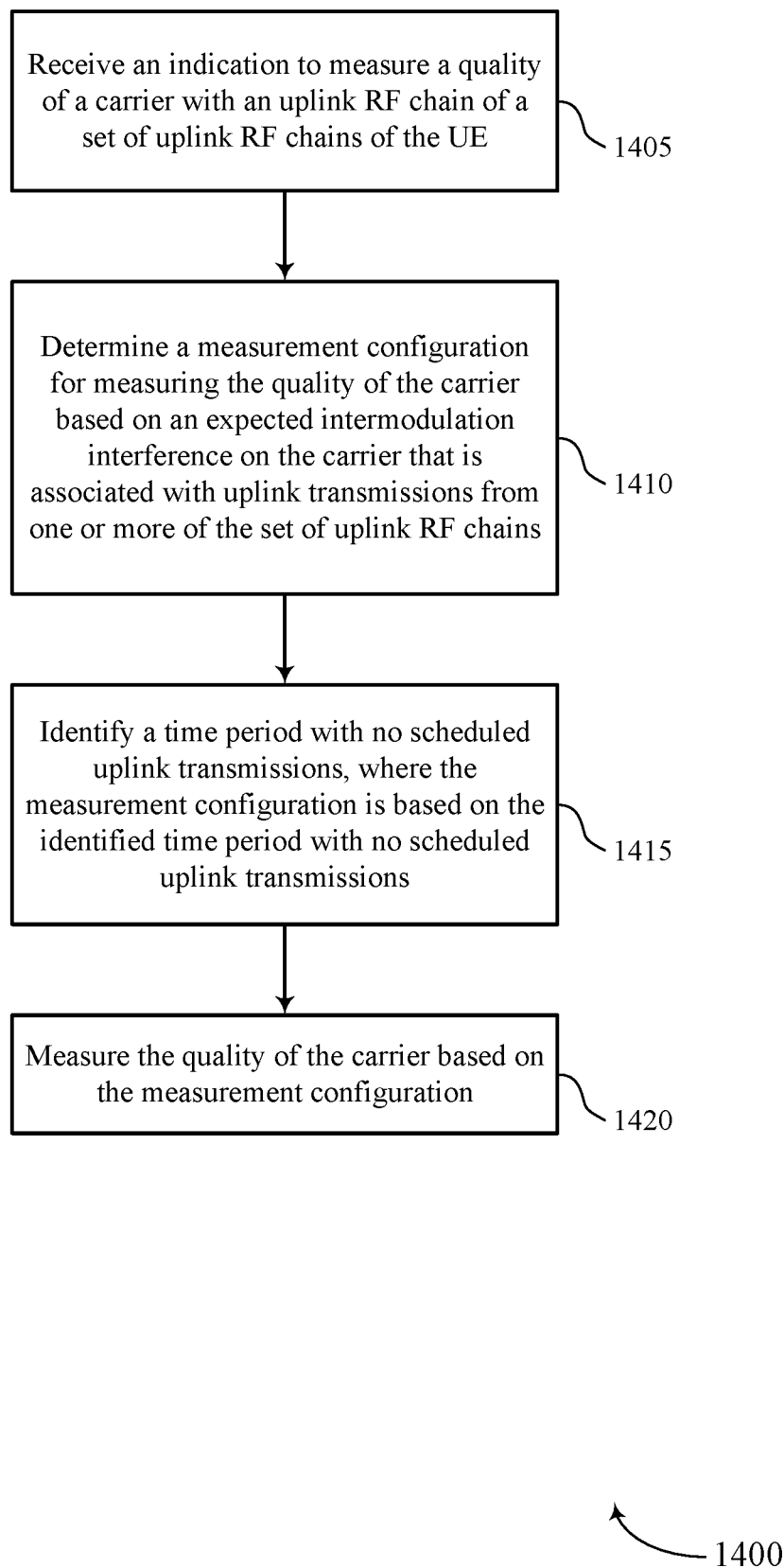

FIG. 14 shows a flowchart illustrating a method 1400 for mobility measurements with interference caused by intermodulation products in accordance with aspects of the present disclosure. The operations of method 1400 may be implemented by a UE 115 or its components as described herein. For example, the operations of method 1400 may be performed by a UE carrier measurement manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1405, the UE 115 may receive an indication to measure a quality of a carrier with an uplink RF chain of a plurality of uplink RF chains of the UE. The operations of 1405 may be performed according to the methods described herein. In certain examples, aspects of the operations of 1405 may be performed by a UE carrier indication component as described with reference to FIGS. 5 through 8.

At 1410, the UE 115 may determine a measurement configuration for measuring the quality of the carrier based on an expected intermodulation interference on the carrier that is associated with uplink transmissions from one or more of the plurality of uplink RF chains. The operations of 1410 may be performed according to the methods described herein. In certain examples, aspects of the operations of 1410 may be performed by a UE measurement configuration component as described with reference to FIGS. 5 through 8.

At 1415, the UE 115 may identify a time period with no scheduled uplink transmissions, where the measurement configuration is based on the identified time period with no scheduled uplink transmissions. The operations of 1415 may be performed according to the methods described herein. In certain examples, aspects of the operations of 1415 may be performed by a UE measurement configuration component as described with reference to FIGS. 5 through 8.

At 1420, the UE 115 may measure the quality of the carrier based on the measurement configuration. The operations of 1420 may be performed according to the methods described herein. In certain examples, aspects of the operations of 1420 may be performed by a UE carrier quality measurement component as described with reference to FIGS. 5 through 8.

Figure 15:
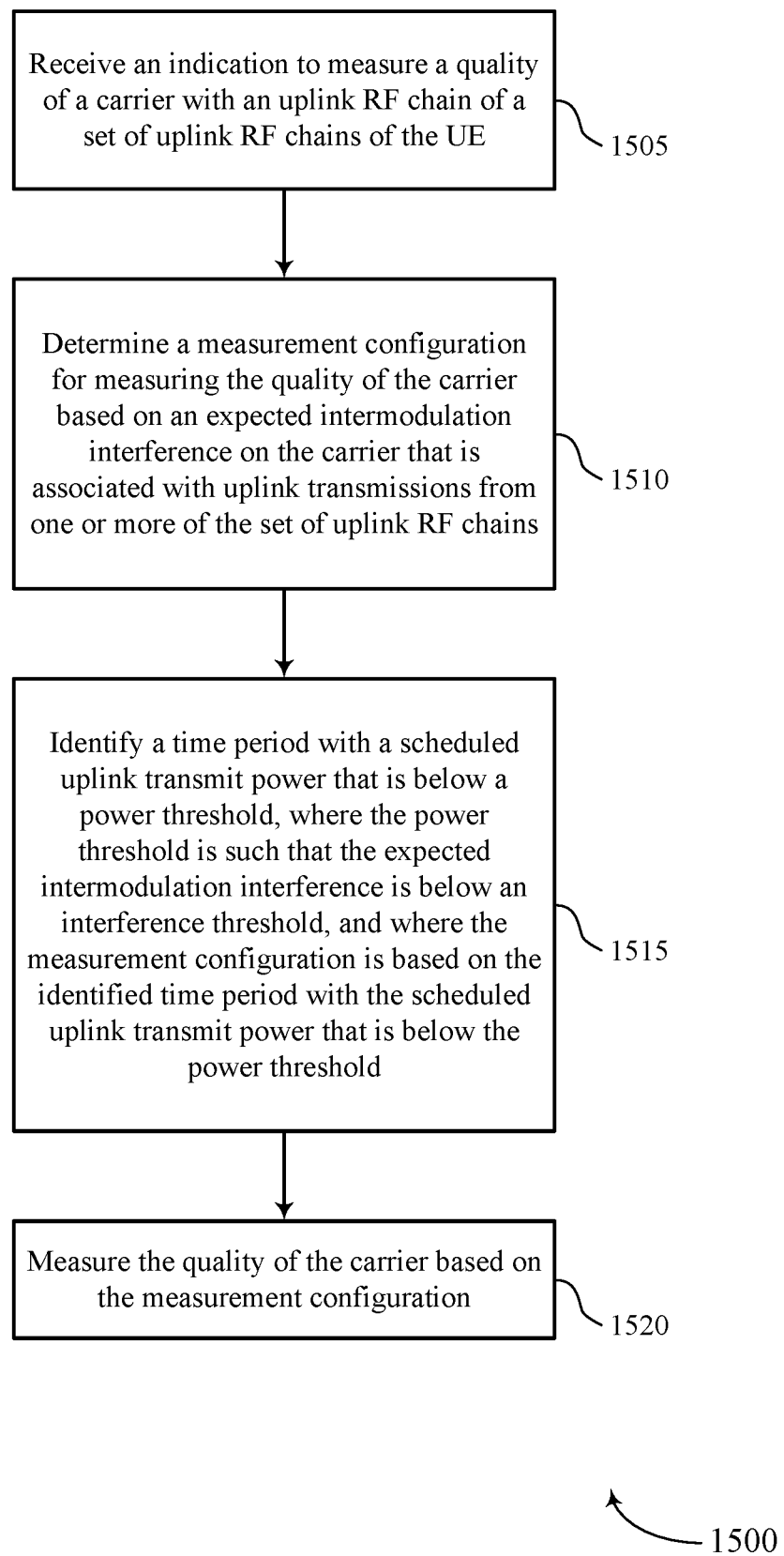

FIG. 15 shows a flowchart illustrating a method 1500 for mobility measurements with interference caused by intermodulation products in accordance with aspects of the present disclosure. The operations of method 1500 may be implemented by a UE 115 or its components as described herein. For example, the operations of method 1500 may be performed by a UE carrier measurement manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1505, the UE 115 may receive an indication to measure a quality of a carrier with an uplink RF chain of a plurality of uplink RF chains of the UE. The operations of 1505 may be performed according to the methods described herein. In certain examples, aspects of the operations of 1505 may be performed by a UE carrier indication component as described with reference to FIGS. 5 through 8.

At 1510, the UE 115 may determine a measurement configuration for measuring the quality of the carrier based on an expected intermodulation interference on the carrier that is associated with uplink transmissions from one or more of the plurality of uplink RF chains. The operations of 1510 may be performed according to the methods described herein. In certain examples, aspects of the operations of 1510 may be performed by a UE measurement configuration component as described with reference to FIGS. 5 through 8.

At 1515, the UE 115 may identify a time period with a scheduled uplink transmit power that is below a power threshold, where the power threshold is such that the expected intermodulation interference is below an interference threshold, and where the measurement configuration is based on the identified time period with the scheduled uplink transmit power that is below the power threshold. The operations of 1515 may be performed according to the methods described herein. In certain examples, aspects of the operations of 1515 may be performed by a UE measurement configuration component as described with reference to FIGS. 5 through 8.

At 1520, the UE 115 may measure the quality of the carrier based on the measurement configuration. The operations of 1520 may be performed according to the methods described herein. In certain examples, aspects of the operations of 1520 may be performed by a UE carrier quality measurement component as described with reference to FIGS. 5 through 8.

Figure 16:
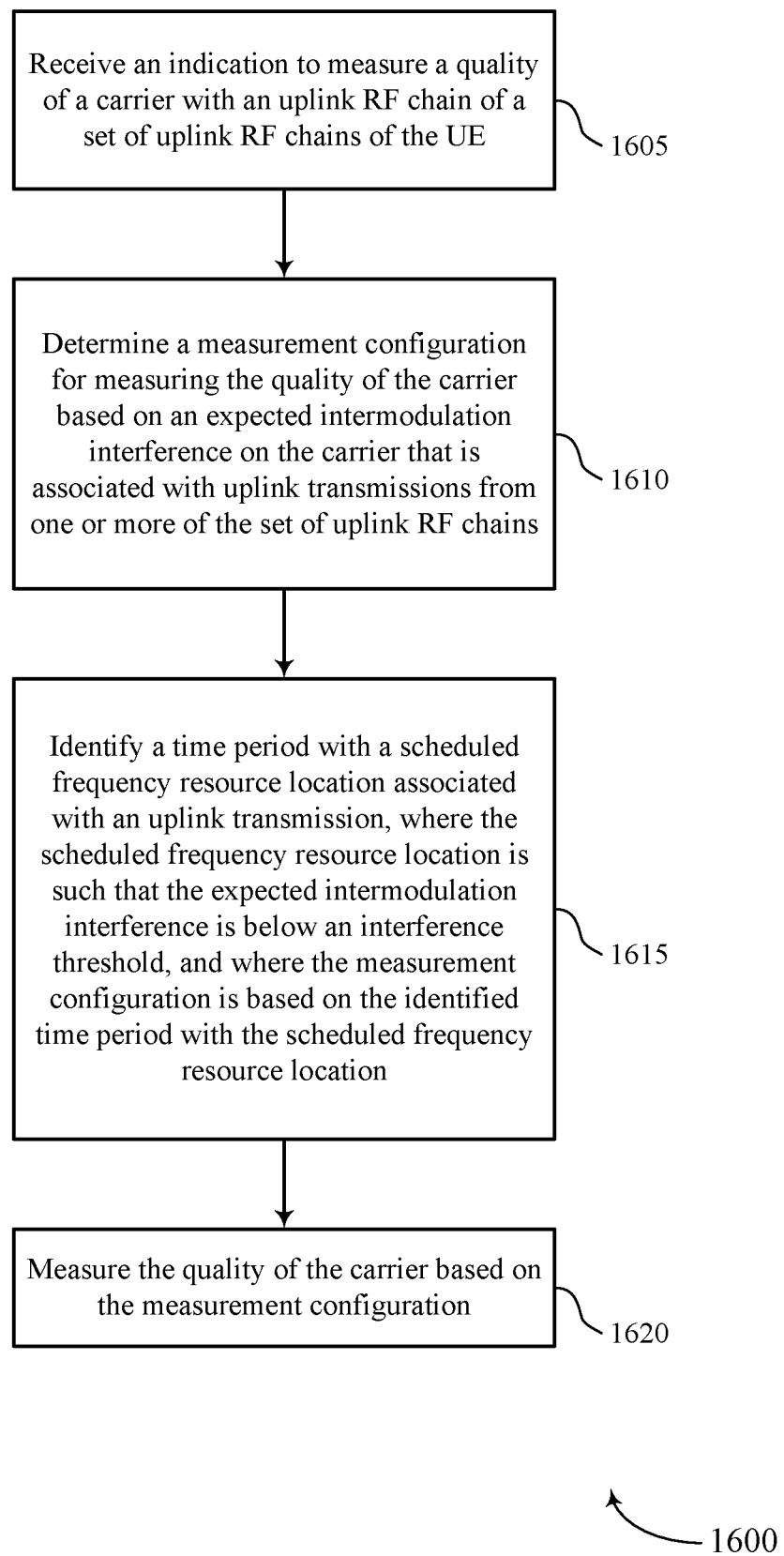

FIG. 16 shows a flowchart illustrating a method 1600 for mobility measurements with interference caused by intermodulation products in accordance with aspects of the present disclosure. The operations of method 1600 may be implemented by a UE 115 or its components as described herein. For example, the operations of method 1600 may be performed by a UE carrier measurement manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1605, the UE 115 may receive an indication to measure a quality of a carrier with an uplink RF chain of a plurality of uplink RF chains of the UE. The operations of 1605 may be performed according to the methods described herein. In certain examples, aspects of the operations of 1605 may be performed by a UE carrier indication component as described with reference to FIGS. 5 through 8.

At 1610, the UE 115 may determine a measurement configuration for measuring the quality of the carrier based on an expected intermodulation interference on the carrier that is associated with uplink transmissions from one or more of the plurality of uplink RF chains. The operations of 1610 may be performed according to the methods described herein. In certain examples, aspects of the operations of 1610 may be performed by a UE measurement configuration component as described with reference to FIGS. 5 through 8.

At 1615, the UE 115 may identify a time period with a scheduled frequency resource location associated with an uplink transmission, where the scheduled frequency resource location is such that the expected intermodulation interference is below an interference threshold, and where the measurement configuration is based on the identified time period with the scheduled frequency resource location. The operations of 1615 may be performed according to the methods described herein. In certain examples, aspects of the operations of 1615 may be performed by a UE measurement configuration component as described with reference to FIGS. 5 through 8.

At 1620, the UE 115 may measure the quality of the carrier based on the measurement configuration. The operations of 1620 may be performed according to the methods described herein. In certain examples, aspects of the operations of 1620 may be performed by a UE carrier quality measurement component as described with reference to FIGS. 5 through 8.

Figure 17:
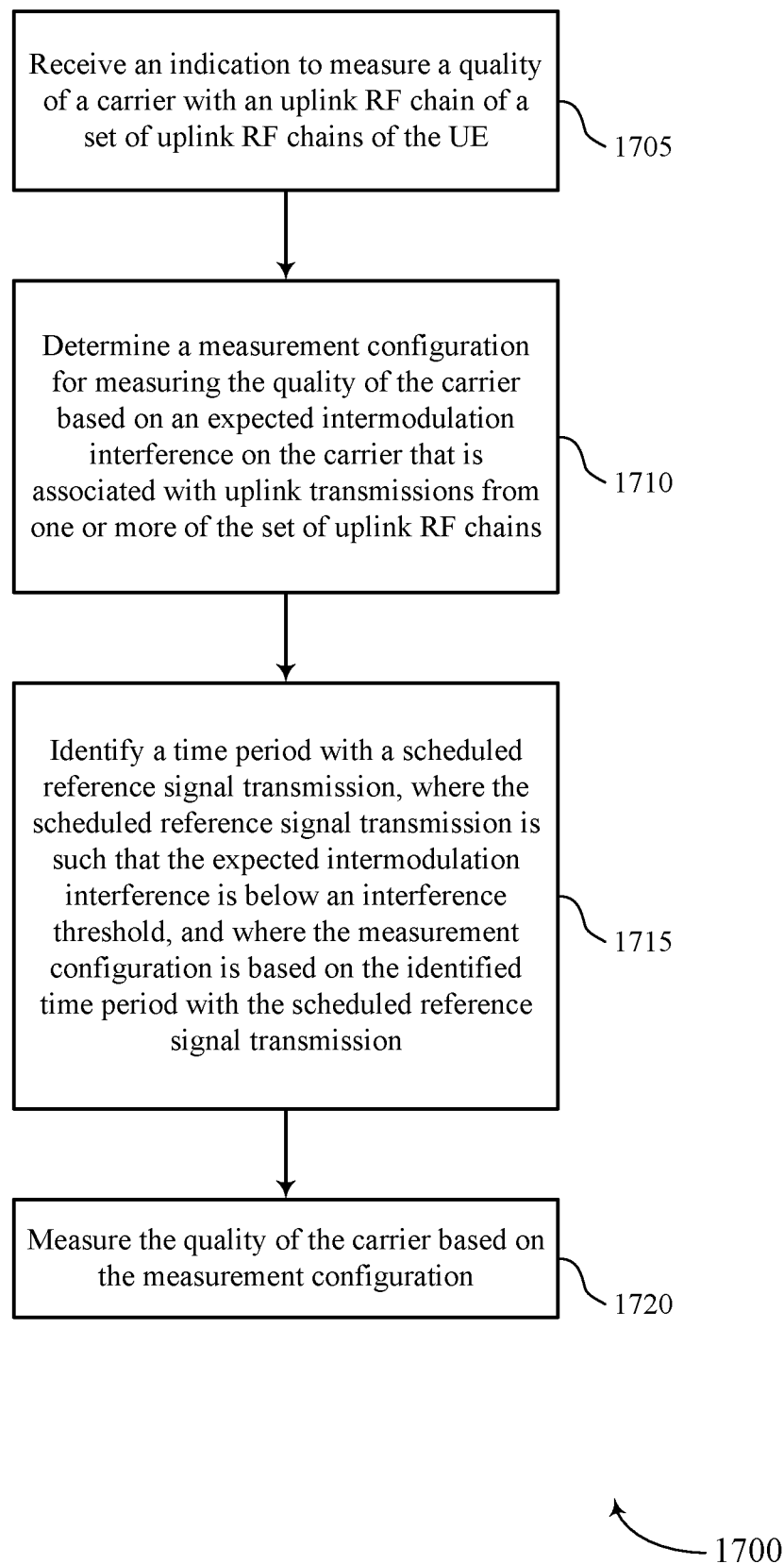

FIG. 17 shows a flowchart illustrating a method 1700 for mobility measurements with interference caused by intermodulation products in accordance with aspects of the present disclosure. The operations of method 1700 may be implemented by a UE 115 or its components as described herein. For example, the operations of method 1700 may be performed by a UE carrier measurement manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1705, the UE 115 may receive an indication to measure a quality of a carrier with an uplink RF chain of a plurality of uplink RF chains of the UE. The operations of 1705 may be performed according to the methods described herein. In certain examples, aspects of the operations of 1705 may be performed by a UE carrier indication component as described with reference to FIGS. 5 through 8.

At 1710, the UE 115 may determine a measurement configuration for measuring the quality of the carrier based on an expected intermodulation interference on the carrier that is associated with uplink transmissions from one or more of the plurality of uplink RF chains. The operations of 1710 may be performed according to the methods described herein. In certain examples, aspects of the operations of 1710 may be performed by a UE measurement configuration component as described with reference to FIGS. 5 through 8.

At 1715, the UE 115 may identify a time period with a scheduled reference signal transmission, where the scheduled reference signal transmission is such that the expected intermodulation interference is below an interference threshold, and where the measurement configuration is based on the identified time period with the scheduled reference signal transmission. The operations of 1715 may be performed according to the methods described herein. In certain examples, aspects of the operations of 1715 may be performed by a UE measurement configuration component as described with reference to FIGS. 5 through 8.

At 1720, the UE 115 may measure the quality of the carrier based on the measurement configuration. The operations of 1720 may be performed according to the methods described herein. In certain examples, aspects of the operations of 1720 may be performed by a UE carrier quality measurement component as described with reference to FIGS. 5 through 8.

Figure 18:
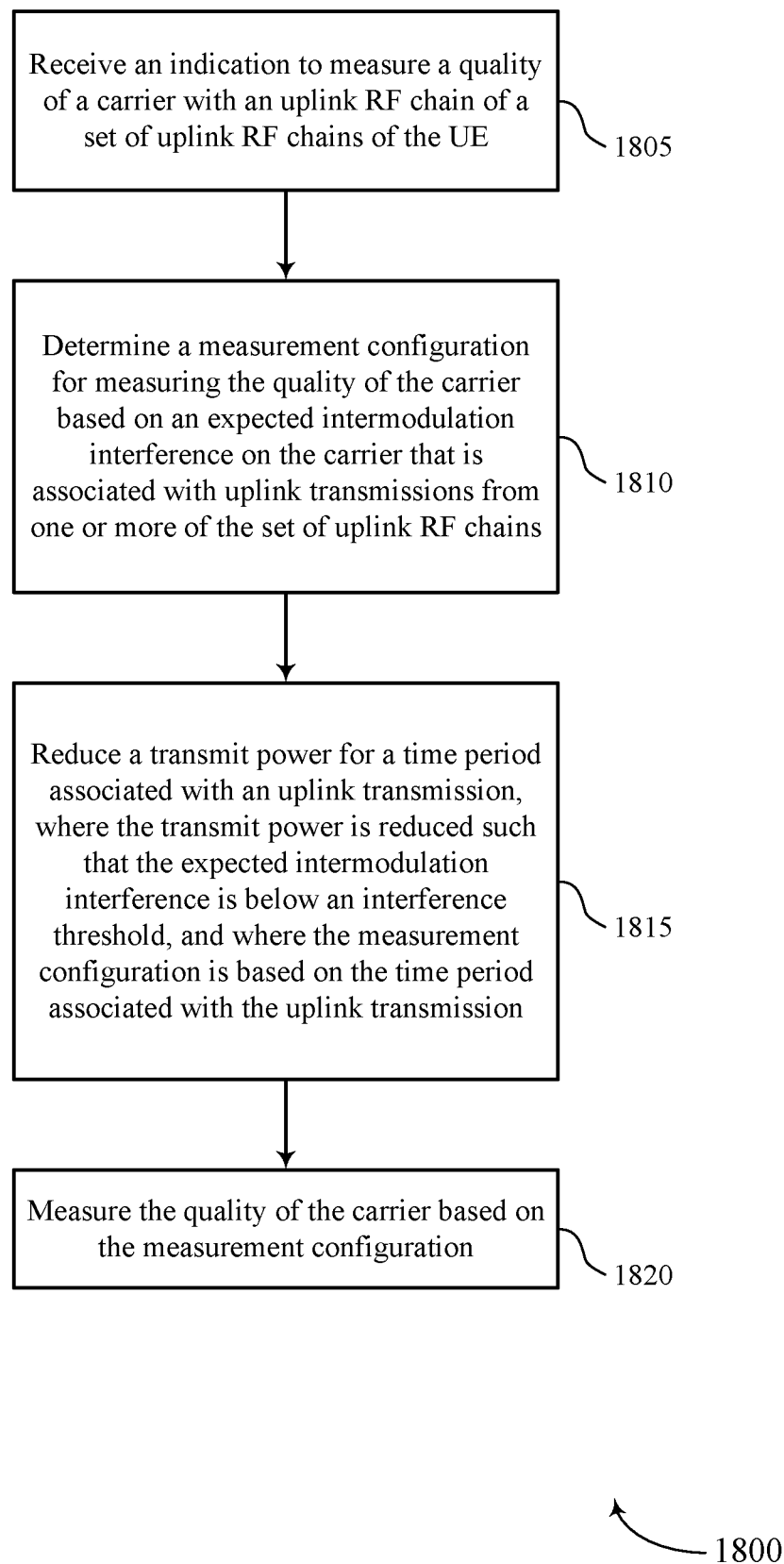

FIG. 18 shows a flowchart illustrating a method 1800 for mobility measurements with interference caused by intermodulation products in accordance with aspects of the present disclosure. The operations of method 1800 may be implemented by a UE 115 or its components as described herein. For example, the operations of method 1800 may be performed by a UE carrier measurement manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1805, the UE 115 may receive an indication to measure a quality of a carrier with an uplink RF chain of a plurality of uplink RF chains of the UE. The operations of 1805 may be performed according to the methods described herein. In certain examples, aspects of the operations of 1805 may be performed by a UE carrier indication component as described with reference to FIGS. 5 through 8.

At 1810, the UE 115 may determine a measurement configuration for measuring the quality of the carrier based on an expected intermodulation interference on the carrier that is associated with uplink transmissions from one or more of the plurality of uplink RF chains. The operations of 1810 may be performed according to the methods described herein. In certain examples, aspects of the operations of 1810 may be performed by a UE measurement configuration component as described with reference to FIGS. 5 through 8.

At 1815, the UE 115 may reduce a transmit power for a time period associated with an uplink transmission, where the transmit power is reduced such that the expected intermodulation interference is below an interference threshold, and where the measurement configuration is based on the time period associated with the uplink transmission. The operations of 1815 may be performed according to the methods described herein. In certain examples, aspects of the operations of 1815 may be performed by a UE measurement configuration component as described with reference to FIGS. 5 through 8.

At 1820, the UE 115 may measure the quality of the carrier based on the measurement configuration. The operations of 1820 may be performed according to the methods described herein. In certain examples, aspects of the operations of 1820 may be performed by a UE carrier quality measurement component as described with reference to FIGS. 5 through 8.

Figure 19:
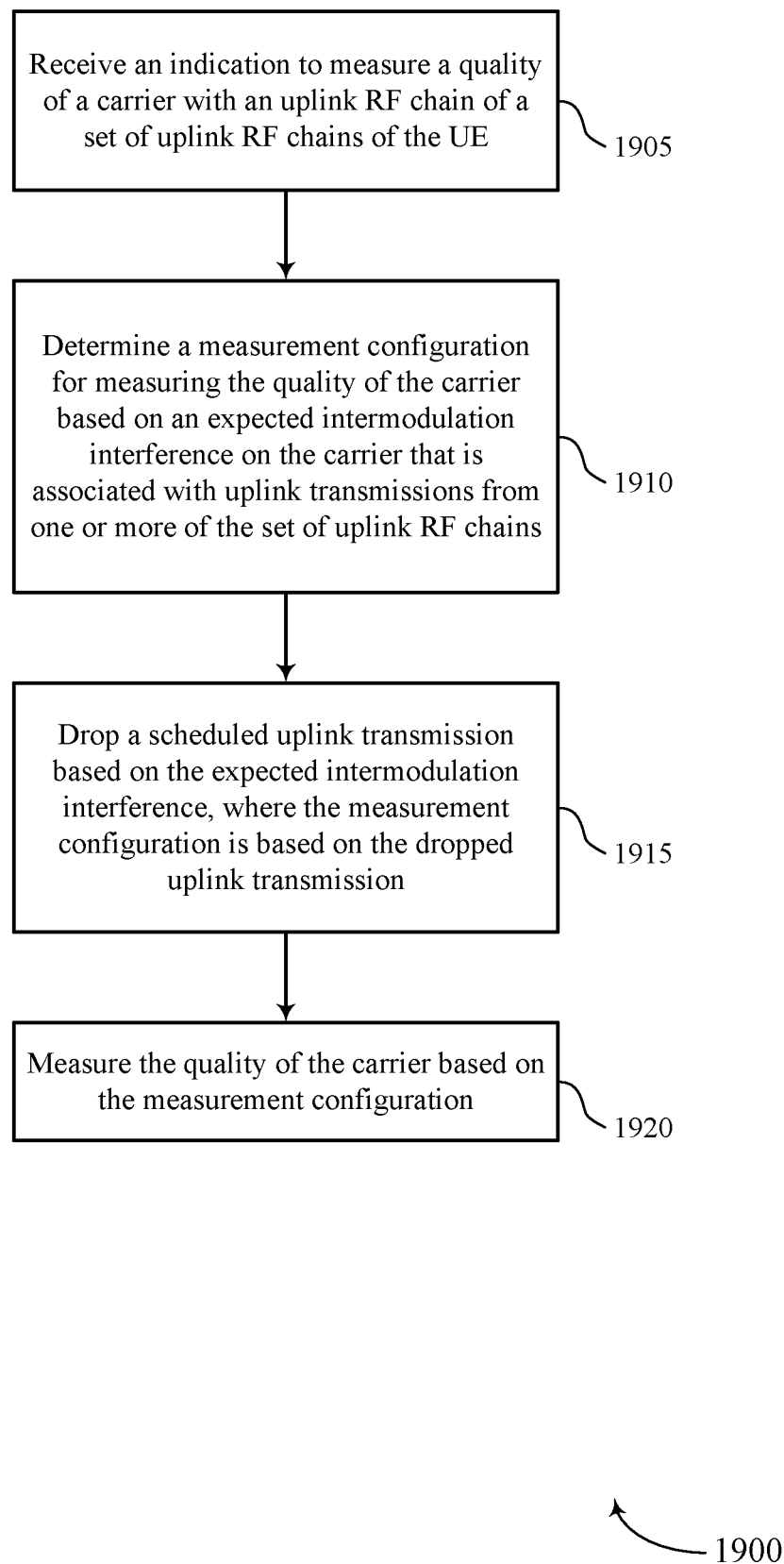

FIG. 19 shows a flowchart illustrating a method 1900 for mobility measurements with interference caused by intermodulation products in accordance with aspects of the present disclosure. The operations of method 1900 may be implemented by a UE 115 or its components as described herein. For example, the operations of method 1900 may be performed by a UE carrier measurement manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1905, the UE 115 may receive an indication to measure a quality of a carrier with an uplink RF chain of a plurality of uplink RF chains of the UE. The operations of 1905 may be performed according to the methods described herein. In certain examples, aspects of the operations of 1905 may be performed by a UE carrier indication component as described with reference to FIGS. 5 through 8.

At 1910, the UE 115 may determine a measurement configuration for measuring the quality of the carrier based on an expected intermodulation interference on the carrier that is associated with uplink transmissions from one or more of the plurality of uplink RF chains. The operations of 1910 may be performed according to the methods described herein. In certain examples, aspects of the operations of 1910 may be performed by a UE measurement configuration component as described with reference to FIGS. 5 through 8.

At 1915, the UE 115 may drop a scheduled uplink transmission based on the expected intermodulation interference, where the measurement configuration is based on the dropped uplink transmission. The operations of 1915 may be performed according to the methods described herein. In certain examples, aspects of the operations of 1915 may be performed by a UE measurement configuration component as described with reference to FIGS. 5 through 8.

At 1920, the UE 115 may measure the quality of the carrier based on the measurement configuration. The operations of 1920 may be performed according to the methods described herein. In certain examples, aspects of the operations of 1920 may be performed by a UE carrier quality measurement component as described with reference to FIGS. 5 through 8.

Figure 20:
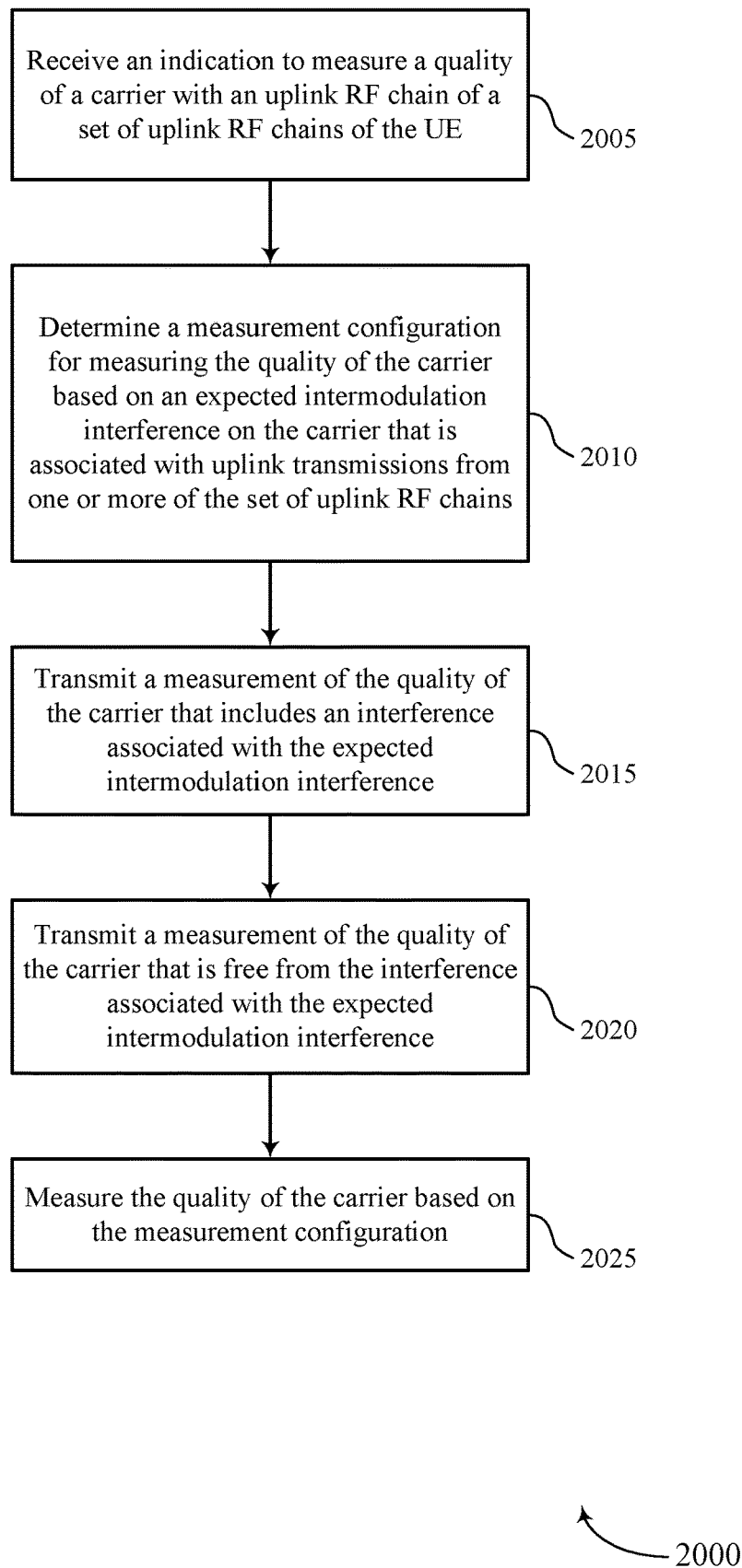

FIG. 20 shows a flowchart illustrating a method 2000 for mobility measurements with interference caused by intermodulation products in accordance with aspects of the present disclosure. The operations of method 2000 may be implemented by a UE 115 or its components as described herein. For example, the operations of method 2000 may be performed by a UE carrier measurement manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 2005, the UE 115 may receive an indication to measure a quality of a carrier with an uplink RF chain of a plurality of uplink RF chains of the UE. The operations of 2005 may be performed according to the methods described herein. In certain examples, aspects of the operations of 2005 may be performed by a UE carrier indication component as described with reference to FIGS. 5 through 8.

At 2010, the UE 115 may determine a measurement configuration for measuring the quality of the carrier based on an expected intermodulation interference on the carrier that is associated with uplink transmissions from one or more of the plurality of uplink RF chains. The operations of 2010 may be performed according to the methods described herein. In certain examples, aspects of the operations of 2010 may be performed by a UE measurement configuration component as described with reference to FIGS. 5 through 8.

At 2015, the UE 115 may transmit a measurement of the quality of the carrier that includes an interference associated with the expected intermodulation interference. The operations of 2015 may be performed according to the methods described herein. In certain examples, aspects of the operations of 2015 may be performed by a UE carrier quality measurement component as described with reference to FIGS. 5 through 8.

At 2020, the UE 115 may transmit a measurement of the quality of the carrier that is free from the interference associated with the expected intermodulation interference. The operations of 2020 may be performed according to the methods described herein. In certain examples, aspects of the operations of 2020 may be performed by a UE carrier quality measurement component as described with reference to FIGS. 5 through 8.

At 2025, the UE 115 may measure the quality of the carrier based on the measurement configuration. The operations of 2025 may be performed according to the methods described herein. In certain examples, aspects of the operations of 2025 may be performed by a UE carrier quality measurement component as described with reference to FIGS. 5 through 8.

Figure 21:
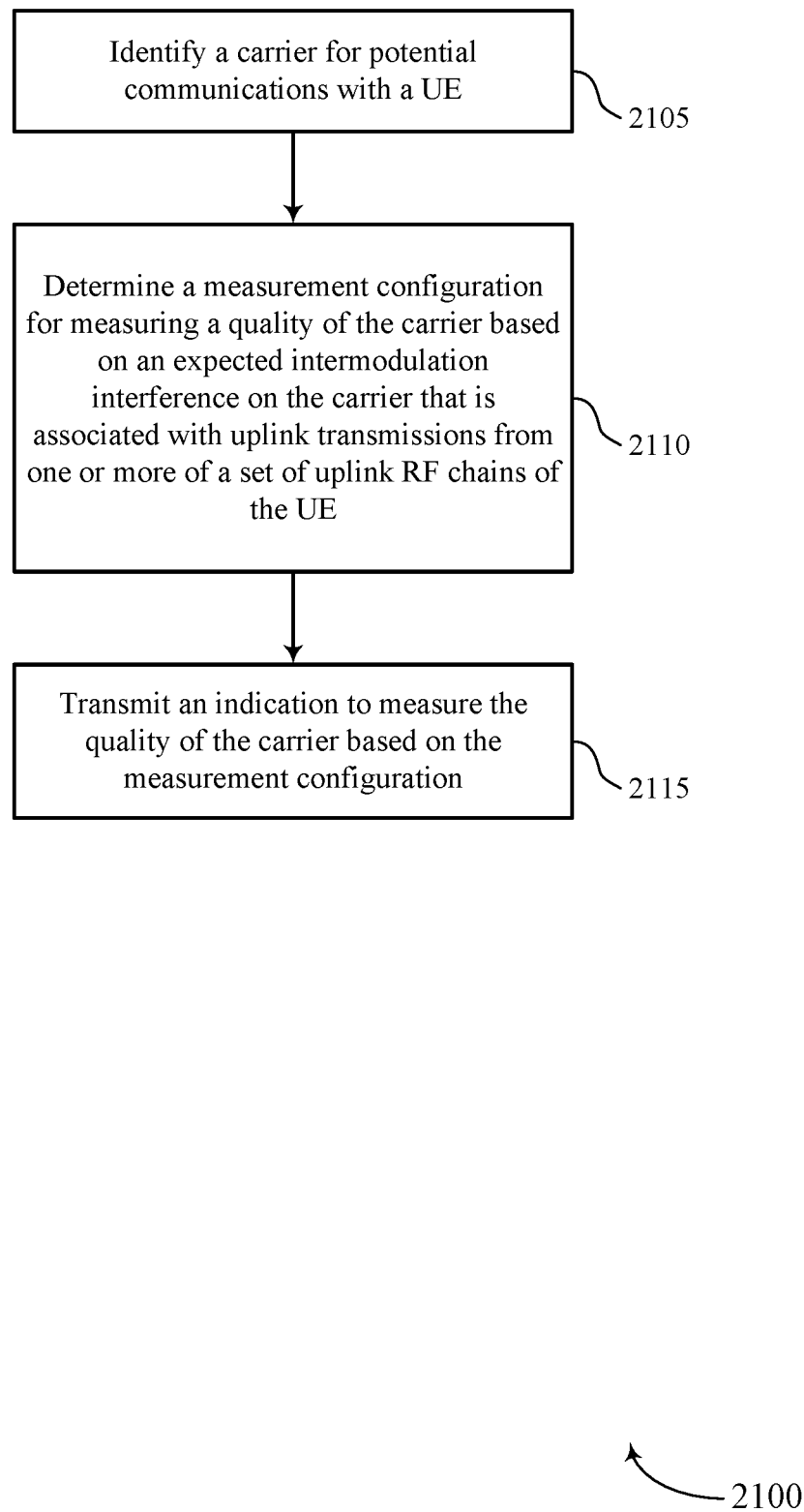

FIG. 21 shows a flowchart illustrating a method 2100 for mobility measurements with interference caused by intermodulation products in accordance with aspects of the present disclosure. The operations of method 2100 may be implemented by a base station 105 or its components as described herein. For example, the operations of method 2100 may be performed by a base station carrier measurement manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 2105, the base station 105 may identify a carrier for potential communications with a UE. The operations of 2105 may be performed according to the methods described herein. In certain examples, aspects of the operations of 2105 may be performed by a carrier identification component as described with reference to FIGS. 9 through 12.

At 2110, the base station 105 may determine a measurement configuration for measuring a quality of the carrier based on an expected intermodulation interference on the carrier that is associated with uplink transmissions from one or more of a plurality of uplink RF chains of the UE. The operations of 2110 may be performed according to the methods described herein. In certain examples, aspects of the operations of 2110 may be performed by a measurement configuration component as described with reference to FIGS. 9 through 12.

At 2115, the base station 105 may transmit an indication to measure the quality of the carrier based on the measurement configuration. The operations of 2115 may be performed according to the methods described herein. In certain examples, aspects of the operations of 2115 may be performed by a carrier indication component as described with reference to FIGS. 9 through 12.

Figure 22:
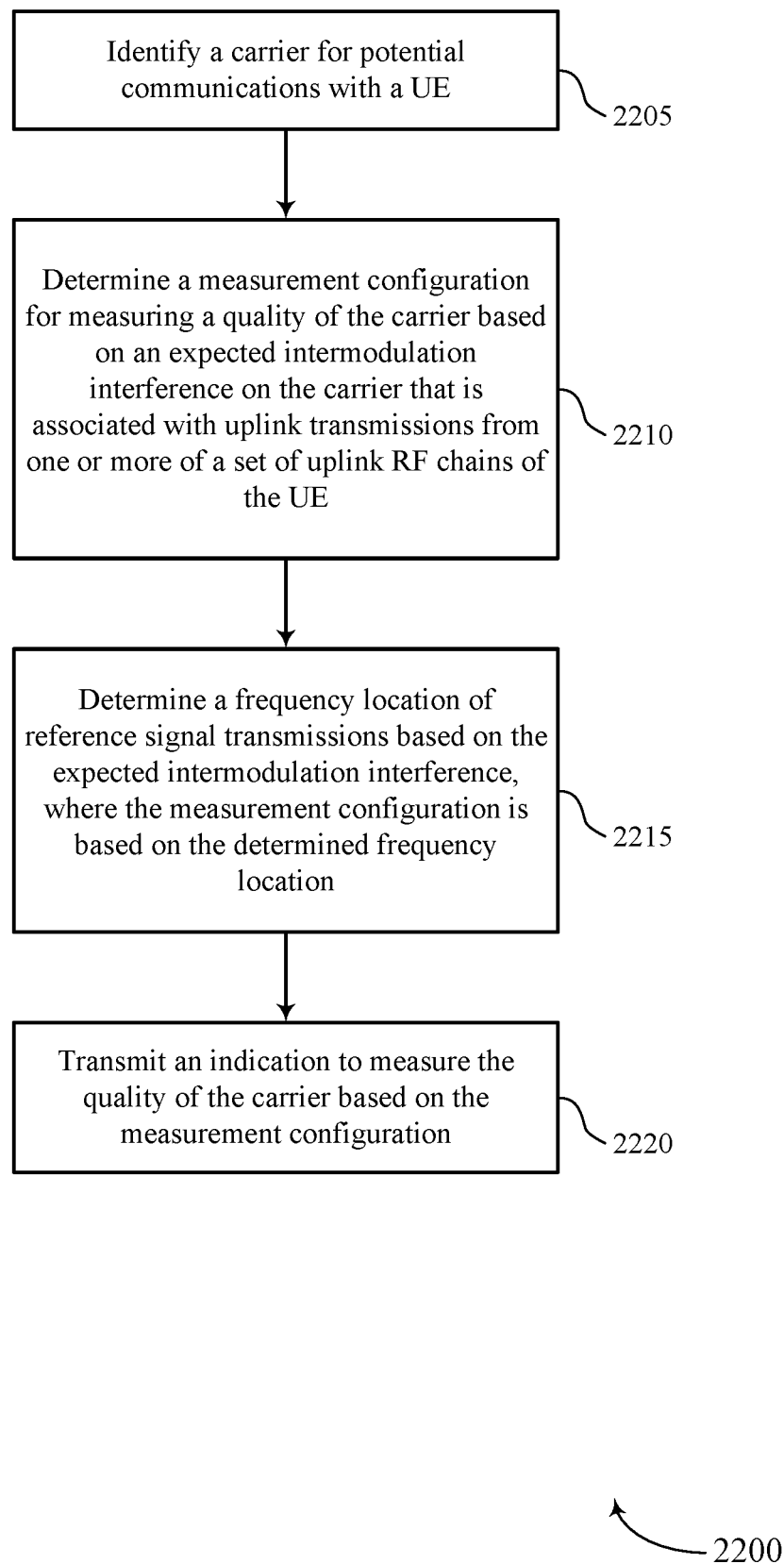

FIG. 22 shows a flowchart illustrating a method 2200 for mobility measurements with interference caused by intermodulation products in accordance with aspects of the present disclosure. The operations of method 2200 may be implemented by a base station 105 or its components as described herein. For example, the operations of method 2200 may be performed by a base station carrier measurement manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 2205, the base station 105 may identify a carrier for potential communications with a UE. The operations of 2205 may be performed according to the methods described herein. In certain examples, aspects of the operations of 2205 may be performed by a carrier identification component as described with reference to FIGS. 9 through 12.

At 2210, the base station 105 may determine a measurement configuration for measuring a quality of the carrier based on an expected intermodulation interference on the carrier that is associated with uplink transmissions from one or more of a plurality of uplink RF chains of the UE. The operations of 2210 may be performed according to the methods described herein. In certain examples, aspects of the operations of 2210 may be performed by a measurement configuration component as described with reference to FIGS. 9 through 12.

At 2215, the base station 105 may determine a frequency location of reference signal transmissions based on the expected intermodulation interference, where the measurement configuration is based on the determined frequency location. The operations of 2215 may be performed according to the methods described herein. In certain examples, aspects of the operations of 2215 may be performed by a measurement configuration component as described with reference to FIGS. 9 through 12.

At 2220, the base station 105 may transmit an indication to measure the quality of the carrier based on the measurement configuration. The operations of 2220 may be performed according to the methods described herein. In certain examples, aspects of the operations of 2220 may be performed by a carrier indication component as described with reference to FIGS. 9 through 12.

Figure 23:
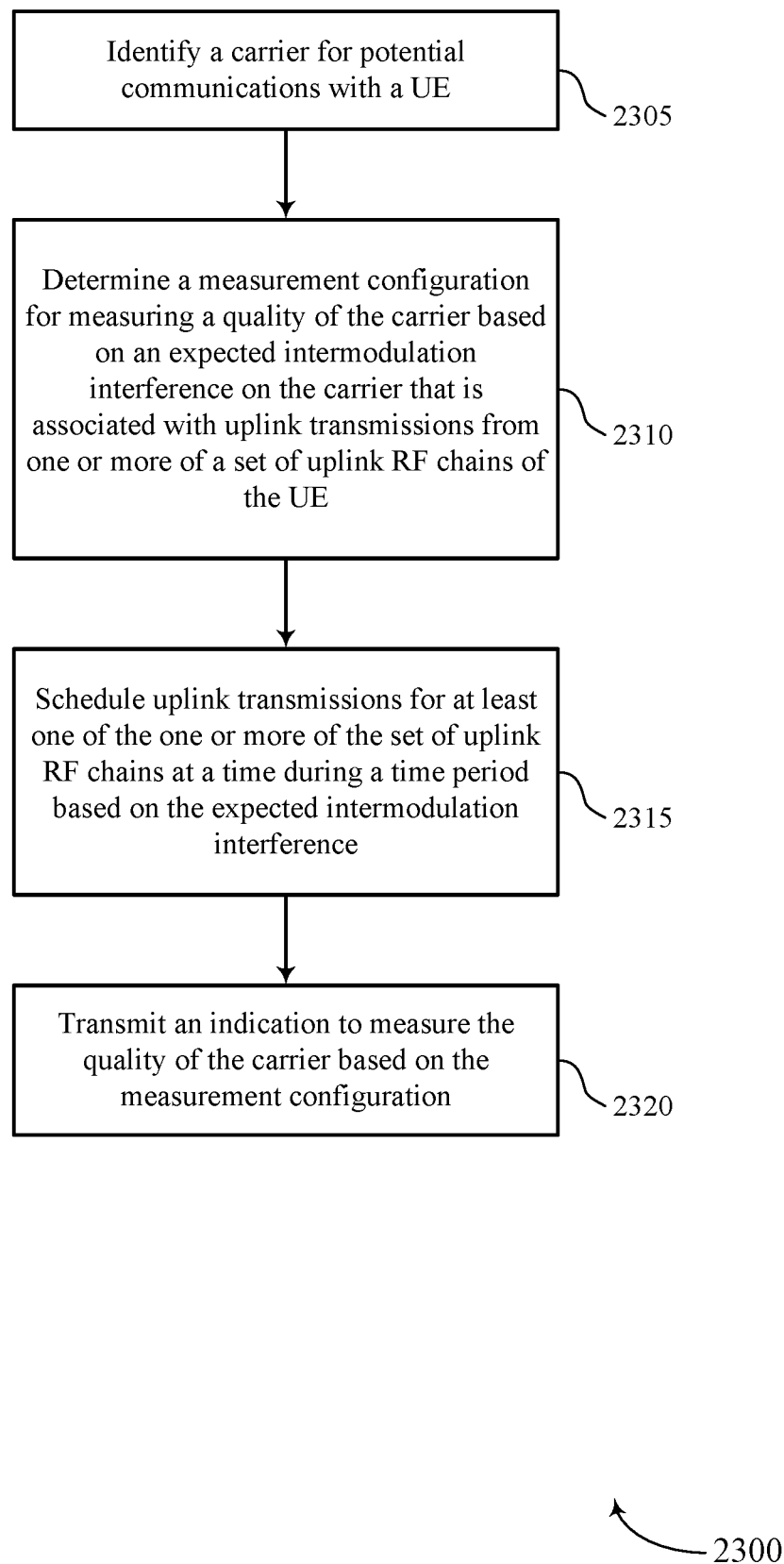

FIG. 23 shows a flowchart illustrating a method 2300 for mobility measurements with interference caused by intermodulation products in accordance with aspects of the present disclosure. The operations of method 2300 may be implemented by a base station 105 or its components as described herein. For example, the operations of method 2300 may be performed by a base station carrier measurement manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 2305, the base station 105 may identify a carrier for potential communications with a UE. The operations of 2305 may be performed according to the methods described herein. In certain examples, aspects of the operations of 2305 may be performed by a carrier identification component as described with reference to FIGS. 9 through 12.

At 2310, the base station 105 may determine a measurement configuration for measuring a quality of the carrier based on an expected intermodulation interference on the carrier that is associated with uplink transmissions from one or more of a plurality of uplink RF chains of the UE. The operations of 2310 may be performed according to the methods described herein. In certain examples, aspects of the operations of 2310 may be performed by a measurement configuration component as described with reference to FIGS. 9 through 12.

At 2315, the base station 105 may schedule uplink transmissions for at least one of the one or more of the plurality of uplink RF chains at a time during a time period based on the expected intermodulation interference. The operations of 2315 may be performed according to the methods described herein. In certain examples, aspects of the operations of 2315 may be performed by an uplink scheduling component as described with reference to FIGS. 9 through 12.

At 2320, the base station 105 may transmit an indication to measure the quality of the carrier based on the measurement configuration. The operations of 2320 may be performed according to the methods described herein. In certain examples, aspects of the operations of 2320 may be performed by a carrier indication component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving an indication to measure a quality of a carrier with an uplink radio frequency (RF) chain of a plurality of uplink RF chains of the UE;
   determining a measurement configuration for measuring the quality of the carrier based at least in part on an expected intermodulation interference on the carrier that is associated with uplink transmissions from the plurality of uplink RF chains; and
   measuring the quality of the carrier based at least in part on the measurement configuration.

2. The method of claim 1, further comprising:
   identifying a time period with no scheduled uplink transmissions, wherein the measurement configuration is based at least in part on the identified time period with no scheduled uplink transmissions.

3. The method of claim 1, further comprising:
   identifying a time period with a scheduled uplink transmit power that is below a power threshold, wherein the power threshold is such that the expected intermodulation interference is below an interference threshold, and wherein the measurement configuration is based at least in part on the identified time period with the scheduled uplink transmit power that is below the power threshold.

4. The method of claim 1, further comprising:
identifying a time period with a scheduled frequency resource location associated with an uplink transmission, wherein the scheduled frequency resource location is such that the expected intermodulation interference is below an interference threshold, and wherein the measurement configuration is based at least in part on the identified time period with the scheduled frequency resource location.

5. The method of claim 1, further comprising:
identifying a time period with a scheduled reference signal transmission, wherein the scheduled reference signal transmission is such that the expected intermodulation interference is below an interference threshold, and wherein the measurement configuration is based at least in part on the identified time period with the scheduled reference signal transmission.

6. The method of claim 5, wherein the scheduled reference signal transmission comprises a synchronization signal (SS) block.

7. The method of claim 1, further comprising:
reducing a transmit power for a time period associated with an uplink transmission, wherein the transmit power is reduced such that the expected intermodulation interference is below an interference threshold, and wherein the measurement configuration is based at least in part on the time period associated with the uplink transmission.

8. The method of claim 1, further comprising:
dropping a scheduled uplink transmission based at least in part on the expected intermodulation interference, wherein the measurement configuration is based at least in part on the dropped uplink transmission.

9. The method of claim 1, further comprising:
transmitting a request for a measurement gap based at least in part on the expected intermodulation interference; and
receiving an indication of the measurement gap, wherein the measurement configuration is based at least in part on the received indication of the measurement gap.

10. The method of claim 1, further comprising:
calculating a value for the expected intermodulation interference;
adjusting a measurement of the quality of the carrier based at least in part on the calculated value of the expected intermodulation interference; and
transmitting an indication of the adjusted measurement of the quality of the carrier.

11. The method of claim 1, further comprising:
transmitting a measurement of the quality of the carrier that includes an interference associated with the expected intermodulation interference; and
transmitting a measurement of the quality of the carrier that is free from the interference associated with the expected intermodulation interference.

12. The method of claim 11, further comprising:
receiving an indication whether to measure the quality of the carrier with the interference associated with the expected intermodulation interference.

13. The method of claim 11, further comprising:
indicating whether a measurement of the quality of the carrier includes the interference associated with the expected intermodulation interference.

14. The method of claim 1, wherein a measurement of the quality of the carrier comprises a reference signal received power (RSRP) measurement, a reference signal received quality (RSRQ) measurement, a reference signal (RS) signal to interference and noise ratio (SINR) measurement, or a combination thereof.

15. The method of claim 1, wherein a measurement of the quality of the carrier comprises a downlink transmission measurement.

16. A method for wireless communication, comprising:
identifying a carrier for potential communications with a user equipment (UE);
determining a measurement configuration for measuring a quality of the carrier based at least in part on an expected intermodulation interference on the carrier that is associated with uplink transmissions from a plurality of uplink radio frequency (RF) chains of the UE; and
transmitting an indication to measure the quality of the carrier based at least in part on the measurement configuration.

17. The method of claim 16, further comprising:
transmitting an indication of a scheduled measurement gap based at least in part on the expected intermodulation interference.

18. The method of claim 17, further comprising:
receiving a request for a measurement gap, wherein the measurement configuration is based at least in part on the request for the measurement gap.

19. The method of claim 16, further comprising:
transmitting an indication whether to measure the quality of the carrier with an interference associated with the expected intermodulation interference.

20. The method of claim 19, further comprising:
receiving a measurement of the quality of the carrier and an indication whether the measurement of the quality of the carrier includes the interference associated with the expected intermodulation interference.

21. The method of claim 16, further comprising:
determining a frequency location of reference signal transmissions based at least in part on the expected intermodulation interference, wherein the measurement configuration is based at least in part on the determined frequency location.

22. The method of claim 16, further comprising:
identifying a time period with a scheduled reference signal transmission, wherein the scheduled reference signal transmission is such that the expected intermodulation interference is below an interference threshold, and wherein the measurement configuration is based at least in part on the identified time period with the scheduled reference signal transmission.

23. The method of claim 22, wherein the scheduled reference signal transmission comprises a synchronization signal (SS) block.

24. The method of claim 16, further comprising:
scheduling uplink transmissions for at least one of the plurality of uplink RF chains at a time during a time period based at least in part on the expected intermodulation interference.

25. The method of claim 16, wherein a measurement of the quality of the carrier comprises a reference signal received power (RSRP) measurement, a reference signal received quality (RSRQ) measurement, a reference signal (RS) signal to interference and noise ratio (SINR) measurement, or a combination thereof.

26. The method of claim 16, wherein a measurement of the quality of the carrier comprises a downlink transmission measurement.

27. An apparatus for wireless communication at a user equipment (UE), comprising:
a processor,
memory in electronic communication with the processor; and
instructions stored in the memory and executable by the processor to cause the apparatus to:
receive an indication to measure a quality of a carrier with an uplink radio frequency (RF) chain of a plurality of uplink RF chains of the UE;
determine a measurement configuration for measuring the quality of the carrier based at least in part on an expected intermodulation interference on the carrier that is associated with uplink transmissions from the plurality of uplink RF chains; and
measure the quality of the carrier based at least in part on the measurement configuration.

28. The apparatus of claim 27, wherein the instructions are further executable by the processor to cause the apparatus to:
identify a time period with no scheduled uplink transmissions, wherein the measurement configuration is based at least in part on the identified time period with no scheduled uplink transmissions.

29. The apparatus of claim 27, wherein the instructions are further executable by the processor to cause the apparatus to:
identify a time period with a scheduled uplink transmit power that is below a power threshold, wherein the power threshold is such that the expected intermodulation interference is below an interference threshold, and wherein the measurement configuration is based at least in part on the identified time period with the scheduled uplink transmit power that is below the power threshold.

30. The apparatus of claim 27, wherein the instructions are further executable by the processor to cause the apparatus to:
identify a time period with a scheduled frequency resource location associated with an uplink transmission, wherein the scheduled frequency resource location is such that the expected intermodulation interference is below an interference threshold, and wherein the measurement configuration is based at least in part on the identified time period with the scheduled frequency resource location.

31. The apparatus of claim 27, wherein the instructions are further executable by the processor to cause the apparatus to:
identify a time period with a scheduled reference signal transmission, wherein the scheduled reference signal transmission is such that the expected intermodulation interference is below an interference threshold, and wherein the measurement configuration is based at least in part on the identified time period with the scheduled reference signal transmission.

32. The apparatus of claim 31, wherein the scheduled reference signal transmission comprises a synchronization signal (SS) block.

33. The apparatus of claim 27, wherein the instructions are further executable by the processor to cause the apparatus to:
reduce a transmit power for a time period associated with an uplink transmission, wherein the transmit power is reduced such that the expected intermodulation interference is below an interference threshold, and wherein the measurement configuration is based at least in part on the time period associated with the uplink transmission.

34. The apparatus of claim 27, wherein the instructions are further executable by the processor to cause the apparatus to:
drop a scheduled uplink transmission based at least in part on the expected intermodulation interference, wherein the measurement configuration is based at least in part on the dropped uplink transmission.

35. The apparatus of claim 27, wherein the instructions are further executable by the processor to cause the apparatus to:
transmit a request for a measurement gap based at least in part on the expected intermodulation interference; and
receive an indication of the measurement gap, wherein the measurement configuration is based at least in part on the received indication of the measurement gap.

36. The apparatus of claim 27, wherein the instructions are further executable by the processor to cause the apparatus to:
calculate a value for the expected intermodulation interference;
adjust a measurement of the quality of the carrier based at least in part on the calculated value of the expected intermodulation interference; and
transmit an indication of the adjusted measurement of the quality of the carrier.

37. The apparatus of claim 27, wherein the instructions are further executable by the processor to cause the apparatus to:
transmit a measurement of the quality of the carrier that includes an interference associated with the expected intermodulation interference; and
transmit a measurement of the quality of the carrier that is free from the interference associated with the expected intermodulation interference.

38. The apparatus of claim 37, wherein the instructions are further executable by the processor to cause the apparatus to:
receive an indication whether to measure the quality of the carrier with the interference associated with the expected intermodulation interference.

39. The apparatus of claim 37, wherein the instructions are further executable by the processor to cause the apparatus to:
indicate whether a measurement of the quality of the carrier includes the interference associated with the expected intermodulation interference.

40. The apparatus of claim 27, wherein a measurement of the quality of the carrier comprises a reference signal received power (RSRP) measurement, a reference signal received quality (RSRQ) measurement, a reference signal (RS) signal to interference and noise ratio (SINR) measurement, or a combination thereof.

41. The apparatus of claim 27, wherein a measurement of the quality of the carrier comprises a downlink transmission measurement.

42. An apparatus for wireless communication, comprising:
a processor,
memory in electronic communication with the processor; and
instructions stored in the memory and executable by the processor to cause the apparatus to:

identify a carrier for potential communications with a user equipment (UE);

determine a measurement configuration for measuring a quality of the carrier based at least in part on an expected intermodulation interference on the carrier that is associated with uplink transmissions from a plurality of uplink radio frequency (RF) chains of the UE; and transmit an indication to measure the quality of the carrier based at least in part on the measurement configuration.

43. The apparatus of claim 42, wherein the instructions are further executable by the processor to cause the apparatus to:

transmit an indication of a scheduled measurement gap based at least in part on the expected intermodulation interference.

44. The apparatus of claim 43, wherein the instructions are further executable by the processor to cause the apparatus to:

receive a request for a measurement gap, wherein the measurement configuration is based at least in part on the request for the measurement gap.

45. The apparatus of claim 42, wherein the instructions are further executable by the processor to cause the apparatus to:

transmit an indication whether to measure the quality of the carrier with an interference associated with the expected intermodulation interference.

46. The apparatus of claim 45, wherein the instructions are further executable by the processor to cause the apparatus to:

receive a measurement of the quality of the carrier and an indication whether the measurement of the quality of the carrier includes the interference associated with the expected intermodulation interference.

47. The apparatus of claim 42, wherein the instructions are further executable by the processor to cause the apparatus to:

determine a frequency location of reference signal transmissions based at least in part on the expected intermodulation interference, wherein the measurement configuration is based at least in part on the determined frequency location.

48. The apparatus of claim 42, wherein the instructions are further executable by the processor to cause the apparatus to:

identify a time period with a scheduled reference signal transmission, wherein the scheduled reference signal transmission is such that the expected intermodulation interference is below an interference threshold, and wherein the measurement configuration is based at least in part on the identified time period with the scheduled reference signal transmission.

49. The apparatus of claim 48, wherein the scheduled reference signal transmission comprises a synchronization signal (SS) block.

50. The apparatus of claim 42, wherein the instructions are further executable by the processor to cause the apparatus to:

schedule uplink transmissions for at least one of the plurality of uplink RF chains at a time during a time period based at least in part on the expected intermodulation interference.

51. The apparatus of claim 42, wherein a measurement of the quality of the carrier comprises a reference signal received power (RSRP) measurement, a reference signal received quality (RSRQ) measurement, a reference signal (RS) signal to interference and noise ratio (SINR) measurement, or a combination thereof.

52. The apparatus of claim 42, wherein a measurement of the quality of the carrier comprises a downlink transmission measurement.

53. An apparatus for wireless communication at a user equipment (UE), comprising:

means for receiving an indication to measure a quality of a carrier with an uplink radio frequency (RF) chain of a plurality of uplink RF chains of the UE;

means for determining a measurement configuration for measuring the quality of the carrier based at least in part on an expected intermodulation interference on the carrier that is associated with uplink transmissions from the plurality of uplink RF chains; and means for measuring the quality of the carrier based at least in part on the measurement configuration.

54. An apparatus for wireless communication, comprising:

means for identifying a carrier for potential communications with a user equipment (UE);

means for determining a measurement configuration for measuring a quality of the carrier based at least in part on an expected intermodulation interference on the carrier that is associated with uplink transmissions from a plurality of uplink radio frequency (RF) chains of the UE; and means for transmitting an indication to measure the quality of the carrier based at least in part on the measurement configuration.

55. A non-transitory computer-readable medium storing code for wireless communication at a user equipment (UE), the code comprising instructions executable by a processor to:

receive an indication to measure a quality of a carrier with an uplink radio frequency (RF) chain of a plurality of uplink RF chains of the UE;

determine a measurement configuration for measuring the quality of the carrier based at least in part on an expected intermodulation interference on the carrier that is associated with uplink transmissions from the plurality of uplink RF chains; and measure the quality of the carrier based at least in part on the measurement configuration.

56. A non-transitory computer-readable medium storing code for wireless communication, the code comprising instructions executable by a processor to:

identify a carrier for potential communications with a user equipment (UE);

determine a measurement configuration for measuring a quality of the carrier based at least in part on an expected intermodulation interference on the carrier that is associated with uplink transmissions from a plurality of uplink radio frequency (RF) chains of the UE; and transmit an indication to measure the quality of the carrier based at least in part on the measurement configuration.

* * * * *